(12) United States Patent  
Ezra et al.

(10) Patent No.: US 10,893,111 B1  
(45) Date of Patent: Jan. 12, 2021

(54) DEVELOPING AND IMPLEMENTING MIGRATION SEQUENCES IN DATA COMMUNICATION NETWORKS

(71) Applicant: ECI Telecom Ltd., Petah Tikva (IL)

(72) Inventors: Shirel Ezra, Moshav gane tal d.n nachal sorek (IL); Efraim Gelman, Ramat Gan (IL); Inbal Hecht, Petah Tikva (IL)

(73) Assignee: ECI TELECOM LTD., Petah Tikva (IL)

( * ) Notice: Subject to any disclaimer, the term of this patent is extended or adjusted under 35 U.S.C. 154(b) by 0 days.

(21) Appl. No.: 16/853,088

(22) Filed: Apr. 20, 2020

Related U.S. Application Data

(63) Continuation of application No. 16/711,930, filed on Dec. 12, 2019, now Pat. No. 10,721,315.

(51) Int. Cl.  
*H04L 29/08* (2006.01)  
*H04Q 11/00* (2006.01)  
*H04L 12/707* (2013.01)

(52) U.S. Cl.  
CPC ............ *H04L 67/16* (2013.01); *H04L 45/22* (2013.01); *H04Q 11/0066* (2013.01); *H04Q 2011/0073* (2013.01); *H04Q 2213/13349* (2013.01)

(58) Field of Classification Search  
CPC ..... H04L 67/16; H04L 45/22; H04Q 11/0066; H04Q 2011/0073; H04Q 2213/13349  
See application file for complete search history.

(56) References Cited

U.S. PATENT DOCUMENTS

| | | | |
|---|---|---|---|
| 8,953,433 B1* | 2/2015 | Grammel | H04B 10/038 370/216 |
| 9,525,634 B2* | 12/2016 | Pacella | H04L 47/125 |
| 10,389,584 B1 | 8/2019 | Ezra | |
| 10,491,510 B1 | 11/2019 | Ezra | |
| 10,498,590 B1 | 12/2019 | Ezra | |
| 10,581,679 B1 | 3/2020 | Ezra | |
| 2013/0031256 A1* | 1/2013 | Hampel | H04L 69/14 709/227 |
| 2015/0312568 A1* | 10/2015 | Lainema | H04N 19/186 375/240.02 |
| 2015/0312658 A1 | 10/2015 | Winzer | |
| 2018/0262422 A1* | 9/2018 | Gerstel | H04L 45/22 |

* cited by examiner

*Primary Examiner* — Steven H Nguyen  
(74) *Attorney, Agent, or Firm* — Finnegan, Henderson Farabow, Garrett & Dunner LLP

(57) ABSTRACT

Techniques for migrating a plurality of communications services in a data communication network are disclosed. Aspects include accessing a migration map for the plurality of communications services; identifying a communications dependency between a first service and a second service according to the migration map, the first service migrating from a first route to a second route, the second service migrating from a third route to a fourth route, and the third route at least partially overlapping with the second route; determining a migration sequence based on the communications dependency, wherein the migration sequence includes a largest subset of the plurality of communications services of which no more than M communications services are allowed to migrate from pre-migration configurations to temporary routes, before migrating to post-migration configurations; and migrating the plurality of communications services from a first plurality of configurations to a second plurality of configurations according to the migration sequence.

25 Claims, 15 Drawing Sheets

DEVELOPING AND IMPLEMENTING MIGRATION SEQUENCES IN DATA COMMUNICATION NETWORKS

CROSS-REFERENCE TO RELATED APPLICATIONS

This application is a continuation of U.S. patent application Ser. No. 16/711,930, filed Dec. 12, 2019, which is incorporated herein by reference in its entirety.

TECHNICAL FIELD

The present disclosure to the field of data communication networks and, more particularly, to systems and methods for migrating services in a data communication network, network optimization, traffic grooming, and service link restoration.

BACKGROUND

A data communication network infrastructure, such as the Internet, can be composed of a large number of network nodes that are connected among one another. Network nodes refer to network components (e.g., clients, servers, microservices, virtual machines, serverless code instances, IoT devices, etc.) that communicate with one another according to predetermined protocols by means of wired or wireless communication links. The data communication network provides services to users according to requirements of the services, such as quality of service (QoS) commitments. Different types of services with different QoS requirements may be provided by the data communication network via different service links formed by the connections between the network nodes deployed in the network.

In a data communication network, resources for services are allocated and optimized according to a current state of the network. With arrivals of new service demands, it is often a desirable to migrate existing services to different sets of configurations, such as different service routes, resource allocations, or the like. In such circumstances, it is desirable to migrate the existing services smoothly such that service disruption is minimized. Moreover, the amount of hardware and software resources available on the data communication network may pose a constraint on the way in which the services can be migrated. It is thus desirable to migrate the existing services without exceeding the system limit.

SUMMARY

In one disclosed embodiment, a method for migrating a plurality of communications services in a data communication network is disclosed. The method comprises accessing a migration map for the plurality of communications services in the data communication network; identifying a communications dependency between a first service and a second service in the plurality of communications services according to the migration map, wherein the first service is configured to migrate from a first route to a second route, the second service is configured to migrate from a third route to a fourth route, and the third route at least partially overlaps with the second route; determining a migration sequence based on the identified communications dependency, wherein the migration sequence includes a largest subset of the plurality of communications services of which no more than M communications services are allowed to migrate from pre-migration configurations to temporary routes, before migrating to post-migration configurations; and migrating the plurality of communications services from a first plurality of configurations to a second plurality of configurations according to the migration sequence.

In another disclosed embodiment, a network management system for migrating a plurality of communications services in a data communication network is disclosed. The network management system comprises at least one processor and a memory for storing instructions executable by the processor. The at least one processor is configured to access a migration map for the plurality of communications services in the data communication network; identify a communications dependency between a first service and a second service in the plurality of communications services according to the migration map, wherein the first service is configured to migrate from a first route to a second route, the second service is configured to migrate from a third route to a fourth route, and the third route at least partially overlaps with the second route; determine a migration sequence based on the identified communications dependency, wherein the migration sequence includes a largest subset of the plurality of communications services of which no more than M communications services are allowed to migrate from pre-migration configurations to temporary routes, before migrating to post-migration configurations; and migrate the plurality of communications services from a first plurality of configurations to a second plurality of configurations according to the migration sequence.

In another disclosed embodiment, a non-transitory computer readable medium is disclosed. The non-transitory computer readable medium stores a set of instructions that is executable by at least one processor of a network management system to cause the network management system to perform operations for migrating a plurality of communications services in a data communication network. The operations comprise accessing a migration map for the plurality of communications services in the data communication network; identifying a communications dependency between a first service and a second service in the plurality of communications services according to the migration map, wherein the first service is configured to migrate from a first route to a second route, the second service is configured to migrate from a third route to a fourth route, and the third route at least partially overlaps with the second route; determining a migration sequence based on the identified communications dependency, wherein the migration sequence includes a largest subset of the plurality of communications services of which no more than M communications services are allowed to migrate from pre-migration configurations to temporary routes, before migrating to post-migration configurations; and migrating the plurality of communications services from a first plurality of configurations to a second plurality of configurations according to the migration sequence.

In another disclosed embodiment, a method for migrating a plurality of communications services in a data communication network is disclosed. The method comprises accessing a migration map for the plurality of communications services, the communication network having a communications dependency between a first service and a set of other services in the plurality of communications services, wherein: the first service requires a first amount of resource $D_1$ and is configured to migrate from a first route to a second route, the set of other services require amounts of resource $D_2, \ldots, D_n$ respectively, and are configured to migrate from a first set of routes to a second set of routes, and the second route at least partially overlaps with the first set of routes or the second set of routes. The method also comprises determining, based on the communications dependency and the required amounts of resource $D_1$-$D_n$, a migration sequence for migrating the plurality of communications services in the data communication network. The method further comprises migrating the plurality of communications services from a first plurality of configurations to a second plurality of configurations according to the migration sequence.

In another disclosed embodiment, a network management system for migrating a plurality of communications services in a data communication network is disclosed. The network management system comprises at least one processor and a memory for storing instructions executable by the processor. The at least one processor is configured to access a migration map for the plurality of communications services, the communication network having a communications dependency between a first service and a set of other services in the plurality of communications services, wherein: the first service requires a first amount of resource $D_1$ and is configured to migrate from a first route to a second route, the set of other services require amounts of resource $D_2, \ldots, D_n$ respectively, and are configured to migrate from a first set of routes to a second set of routes, and the second route at least partially overlaps with the first set of routes or the second set of routes. The at least one processor is also configured to determine, based on the communications dependency and the required amounts of resource $D_1$-$D_n$, a migration sequence for migrating the plurality of communications services in the data communication network. The at least one processor is further configured to migrate the plurality of communications services from a first plurality of configurations to a second plurality of configurations according to the migration sequence.

In yet another disclosed embodiment, a non-transitory computer readable medium is disclosed. The non-transitory computer readable medium stores a set of instructions that is executable by at least one processor of a network management system to cause the network management system to perform operations for migrating a plurality of communications services in a data communication network. The operations comprise accessing a migration map for the plurality of communications services, the communication network having a communications dependency between a first service and a set of other services in the plurality of communications services, wherein: the first service requires a first amount of resource $D_1$ and is configured to migrate from a first route to a second route, the set of other services require amounts of resource $D_2, \ldots, D_n$ respectively, and are configured to migrate from a first set of routes to a second set of routes, and the second route at least partially overlaps with the first set of routes or the second set of routes. The operations also comprise determining, based on the communications dependency and the required amounts of resource $D_1$-$D_n$, a migration sequence for migrating the plurality of communications services in the data communication network. The operations further comprise migrating the plurality of communications services from a first plurality of configurations to a second plurality of configurations according to the migration sequence The foregoing general description and the following detailed description are exemplary and explanatory only, and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
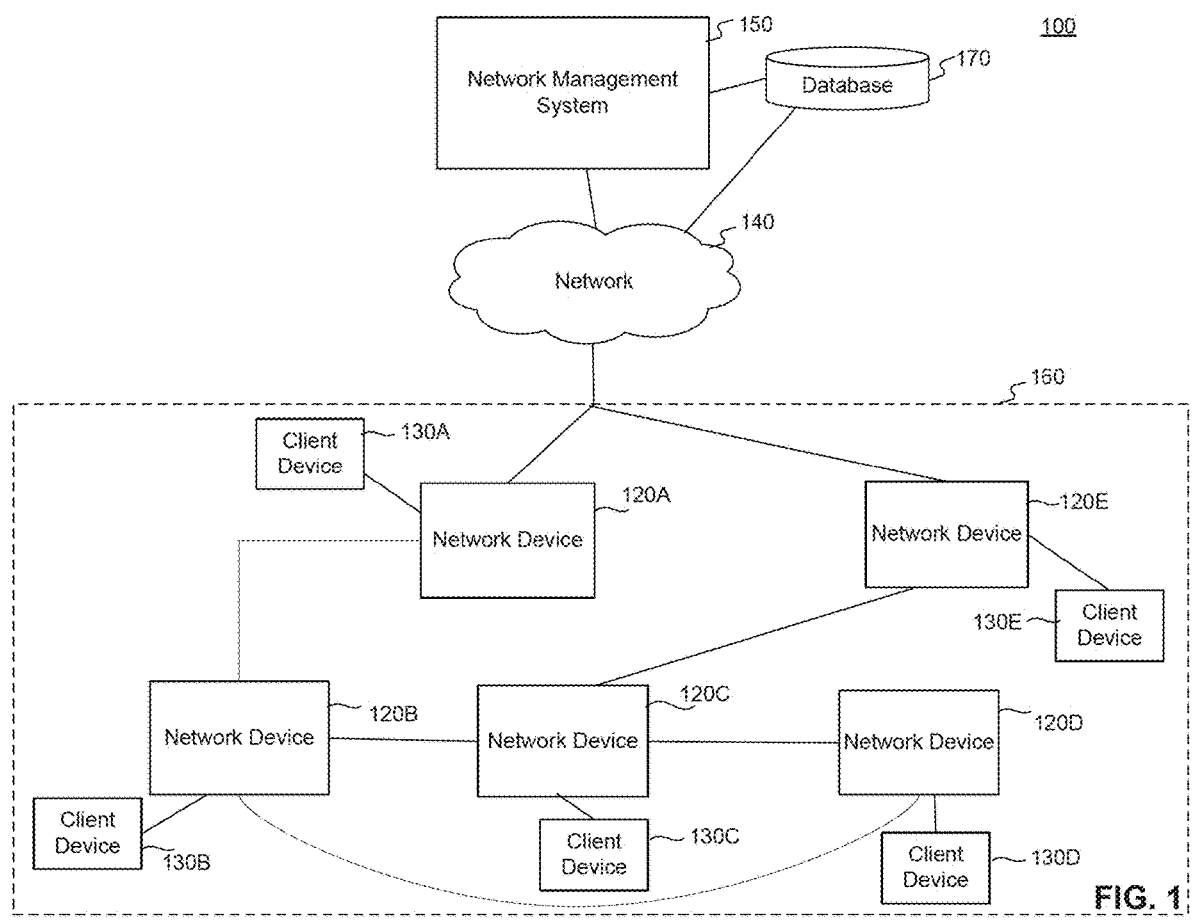
FIG. 1 is a diagram of an example data communication network in which various implementations described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an example data communication network 100 in which various implementations as described herein may be practiced. Data communication network 100 includes, for example, a network 140, network management system 150, database 170, network devices 120A-120E, and client devices 130A-130E. The network devices 120A-120E and client devices 130A-130E form a service network 160, in which the network devices 120A-120E (collectively 120) provide data services to client devices 130A-130E (collectively 130), or vice versa. The network devices 120A-120E may be, for example, hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each network device 120 may be associated with no, one, or many client devices 130. In various embodiments, service network 160 may be based on one or more of on-premises network environments, virtualized (cloud) network environments (e.g., based on AWS™, Azure™, Docker™, Kubernetes™, etc.), or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 is configured to manage service deliveries for the service network 160. For example, the network management system 150 may determine service routes and allocate resources for services to be delivered in the data communication network 100. The network management system 150 may also reallocate resources for the existing services when new service demands arrive at the data communication network 100. In some embodiments, the network management system 150 may manage sequences of service migrations when multiple services are to be reconfigured in the data communication network 100. In some embodiments, when a link failure occurs, the network management system 150 may identify restoration schemes for the disrupted service. For example, the network management system 150 may identify alternate service links that do not involve the failed communication link. In some embodiments, the network management system 150 may identify a set of service links that is sufficient to satisfy the service demands in the data communication network 100 and in the meantime reduce the operation cost (e.g., in terms of equipment usage, bandwidth, processing activity, data storage, monetary cost, etc.) in the network. Network management system 150 can be a computer-based system including computer system components, desktop computers, workstations, tablets, handheld computing devices, memory devices, and/or internal network(s) connecting the components, as described in connection with FIG. 2.

Network 140 facilitates communication between the network management system 150 and the service network 160. Network management system 150 may send data to network devices 120 via network 140 to allocate resources for services in the data communication network 100. Network management system 150 may also receive data from network devices 120 via network 140 indicating the status of service links in the data communication network 100. Network 140 may be an electronic network. Network devices 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices 130) to send and receive data via applicable communication protocols, including those described above.

In the illustrated example, network devices 120A and 120E are directly connected to network 140, and network devices 120B-120D connect to the network 140 via their connection to network device 120A and/or 120E. One of ordinary skill in the art would appreciate that network devices 120B-120D may also directly connect to the network 140, or may indirectly connect to the network 140 through numerous other devices. Network devices 120 may be connected to one another via copper wire, coaxial cable, optical fiber, microwave links, or other satellite or radio communication components. Accordingly, network devices 120 may each have a corresponding communications interface (e.g., wireless transceiver, wired transceiver, adapter, etc.) to allow for such communications.

As shown in FIG. 1, network devices 120A-120E are connected to one another. In this example, network device 120A is connected to network device 120B, network device 120B is connected to network devices 120A, 120C, and 120D, network device 120C is connected to network devices 120B, 120D, and 120E, network device 120D is connected to network devices 120B and 120C, and network device 120E is connected to network device 120C. In some embodiments, a network topology may be formed to present a graphical view of the service network 160, where each of the network devices 120 corresponds to a network node or vertex in the network topology. In this disclosure, the terms "node" and "vertex" are exchangeable. The network topology also shows the interconnection relationships among the network devices. In some embodiments, the network management system 150 may obtain the connectivity status between the network devices 120 and generate a network topology. In other embodiments, the network management system 150 may acquire the network topology from a server or a database associated with a service provider providing the service network 160. One of ordinary skill in the art would appreciate that the service network 160 illustrated in FIG. 1 is merely an example, and the network topology of service network 160 can be different from the example without departing from the scope of the present disclosure.

Network management system 150 may reside in a server or may be configured as a distributed system including network devices 120 or as a distributed computer system including multiple servers, server farms, clouds, computers, or virtualized computing resources that interoperate to perform one or more of the processes and functionalities associated with the disclosed embodiments.

Database 170 includes one or more physical or virtual storages coupled with the network management system 150. Database 170 may be configured to store information associated with the service network 160, such as the network topology, the capability of the network devices 120, the services and corresponding configurations provided by the service network 160, and so on. Database 170 may also be adapted to store processed information associated with the network topology and services in the service network 160, so as to facilitate efficient route configurations and resource allocations to satisfy the service demands in the service network 160. The data stored in the database 170 may be transmitted to the network management system 150 and/or the network devices 120. In some embodiments, the database 170 is stored in a cloud-based server (not shown) that is accessible by the network management system 150 and/or the network devices 120 through the network 140. While the database 170 is illustrated as an external device connected to the network management system 150, the database 170 may also reside within the network management system 150 as an internal component of the network management system 150.

As shown in FIG. 1, network devices 120A-120E are connected with client devices 130A-130E respectively to deliver services. As an example, client devices 130A-130E include a display such as a television, tablet, computer monitor, video conferencing console, IoT device, or laptop computer screen, etc. Client devices 130A-130E may also include video/audio input devices such as a video camera, web camera, or the like. As another example, client devices 130A-130E may include mobile devices such as a tablet or a smartphone having display and video/audio capture capabilities. While FIG. 1 shows one client device 130 connected to each network device 120, one of ordinary skill in the art would appreciate that more than one client device 130 may be connected to a network device 120 and that in some instances a network device 120 may not be connected to any client device 130.

In some embodiments, the data communication network 100 may include an optical network, where the network devices 120 are interconnected by optical fiber links. The optical fiber links may be capable of conveying a plurality of optical channels using a plurality of specified different optical wavelengths. The optical network may be based on, for example, a wavelength division multiplexing (WDM) physical layer. A WDM optical signal comprises a plurality of transmission channels, each channel carrying an information signal modulated over a carrier wavelength. For example, the network devices 120 may be provided with the ability to switch a channel from an input fiber to an output fiber, and to add/drop traffic. The network devices 120 may include a wavelength switch or an optical add/drop multiplexer that performs optical add, drop, and pass through. The network devices 120 may include optical or optical/electrical elements being adapted to perform to various functions such as compensating, amplifying, switching, restoring, performing wavelength conversion of incoming optical signals, etc. The optical fiber links may include dispersion compensation fibers (DCF), optical filters, amplifiers and other relevant optical components that are used for operation of optical networks. The network management system 150 or database 170 may store topologic data that includes information about optical channels and their associated wavelengths. In some embodiments, the data communication network 100 may include a network controller (not shown) configured to improve network utilization by providing an optimal routing and wavelength assignment plan for a given set of service demands. In the context of an optical network, a service demand may be a request for a wavelength or one or more sets of wavelengths (e.g., Flex-Grid), between two nodes in the network. A circuit may be provisioned to satisfy a service demand and may be characterized by a route and an assigned wavelength number or one or more sets of wavelength numbers. For simplicity, the following description uses the wavelength notation, but it is contemplated that the singular "wavelength" used herein may also refer to one or more sets of wavelengths.

Figure 2:
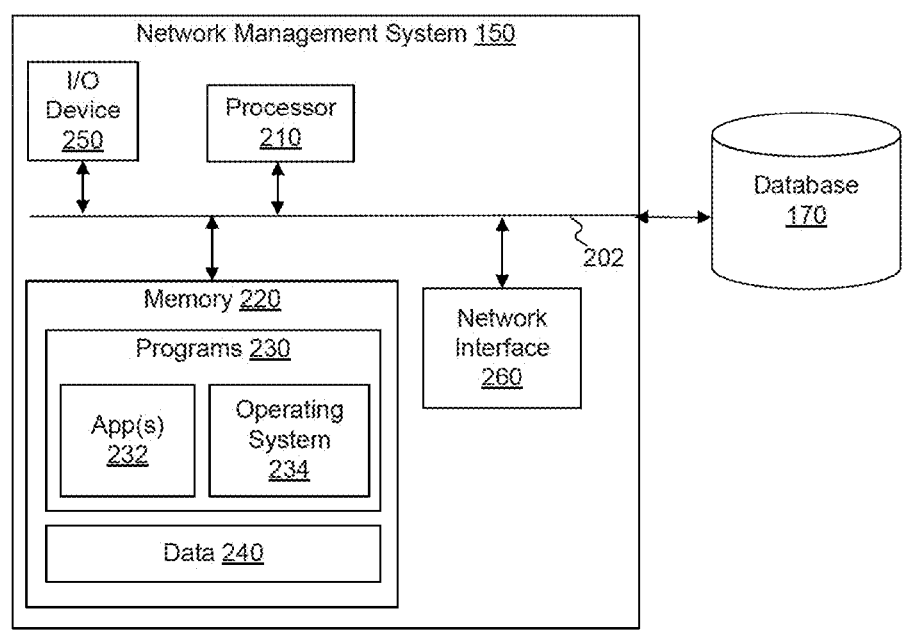
FIG. 2 is a diagram of an example network management system, consistent with the disclosed embodiments.

FIG. 2 shows a diagram of an example network management system 150, consistent with the disclosed embodiments. The network management system 150 may be implemented as a specially made machine that is specially programed to perform functions relating to managing a data communication network. The special programming at the network management system 150 enables network management system 150 to determine service routes and allocate resources for services to be delivered in the data communication network 100.

The network management system 150 includes a bus 202 (or other communication mechanism) which interconnects subsystems and components for transferring information within the network management system 150. As shown, the network management system 150 includes one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the network management system 150).

The processor 210 may be one or more processing devices configured to perform functions of the disclosed methods, such as a microprocessor manufactured by Intel™ or AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the network management system 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232, operating system 234, and data 240. Exemplary forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The network management system 150 may include one or more storage devices configured to store information used by processor 210 (or other components) to perform certain functions related to the disclosed embodiments. For example, the network management system 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the network management system 150) or external storage communicatively coupled with the network management system 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, the network management system 150 may be communicatively connected to one or more remote memory devices (e.g., remote databases (not shown)) through network 140 or a different network. The remote memory devices can be configured to store information that the network management system 150 can access and/or manage. By way of example, the remote memory devices could be document management systems, Microsoft™ SQL databases, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions of the disclosed embodiments. Moreover, the processor 210 may execute one or more programs located remotely from one or more components of the data communication network 100. For example, the network management system 150 may access one or more remote programs that, when executed, perform functions related to disclosed embodiments.

In some embodiments, server app(s) 232 may cause the processor 210 to perform one or more functions of the disclosed methods. For example, the server app(s) 232 may cause the processor 210 to determine service routes and allocate resources for services to be delivered in the data communication network 100.

In some embodiments, the program(s) 230 may include the operating system 234 performing operating system functions when executed by one or more processors such as the processor 210. By way of example, the operating system 234 may include Microsoft Windows™, Unix™, Linux™, or Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. The network management system 150 may also include software that, when executed by a processor, provides communications with network 140 through the network interface 260 and/or a direct connection to one or more network devices 120A-120E.

In some embodiments, the data 240 may include, for example, network configurations, requirements of service demands, routes for existing service, capacity of the network devices and each service path, and so on. For example, the data 240 may include network topology data of the service network 160, capacity data of the network devices 120, and capacity data of the communication links between the network devices 120. The data 240 may also include requirements data of service demands and resource allocation data for each service in the service network 160.

The network management system 150 may also include one or more I/O devices 250 having one or more interfaces for receiving signals or input from devices and providing signals or output to one or more devices that allow data to be received and/or transmitted by the network management system 150. For example, the network management system 150 may include interface components for interfacing with one or more input devices, such as one or more keyboards, mouse devices, and the like, that enable the network management system 150 to receive input from an operator or administrator (not shown).

Migrating Services

In a data communication network, there is often a need to migrate configurations of services. For example, due to arrival of new services, resources allocated for the existing services may be changed to satisfy the demands of the new services in the network. New routes may be allocated to the existing services, and allocation of resources on a path may be reconfigured. In this disclosure, the term "path" refers to a source-destination physical or logical route (such as an A-Z path). A path can have one or more configurations, as a result of allocations of different resources, such as different wavelength assignments.

Figure 3:
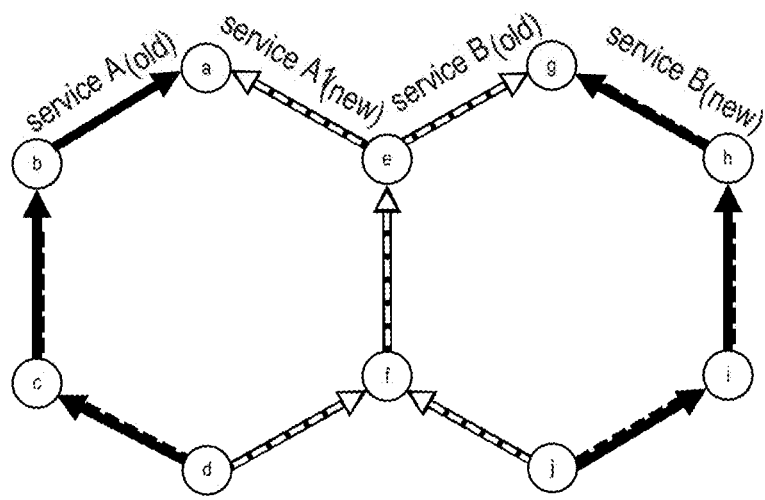
FIG. 3 is a diagram of an example service migration map, consistent with the present disclosure.

FIG. 3 is a diagram of an example service migration map 300, consistent with the present disclosure. FIG. 3 illustrates configurations for services A and B in the data communication network. In the data communication network, each service demand can be identified by a tuple <s, t>, with s and t being the source and destination node of the service demand. In this example, service A that is to be delivered from source node "d" to destination node "a" can be identified by <d, a>, and service B that is to be delivered from source node "j" to destination node "g" can be identified by <j, g>. As discussed earlier, a network node refers to a network component, such as network devices 120, that communicates with one another according to predetermined protocols by means of wired or wireless communication links.

As shown in FIG. 3, before migration, service A is routed along path d→c→b→a, and service B is routed along path j→f→e→g. After service migration, service A is rerouted to link d→f→e→a, and service B is rerouted to path j→i→h→g. Thus, the path f→e is part of the service route for service B before service migration, and is also part of the service route for service A after service migration. As the path f→e is involved in the migration of services both A and B, an optimized migration sequence may be required to minimize the service disruption. In this example, it is desired to first migrate service B to remove the service B on the path f→e, before adding service A on the path f→e to migrate service A, such that path f→e does not carry both services A and B during the migration phase. In doing so, the chance of service disruption due to the limited bandwidth on path f→e is reduced. FIG. 3 serves as an example of service migration map. One of ordinary skill in the art would appreciate that a data communication network may provide more than two services, and there may be more than one overlapping path between migrations of the services.

Figure 4:
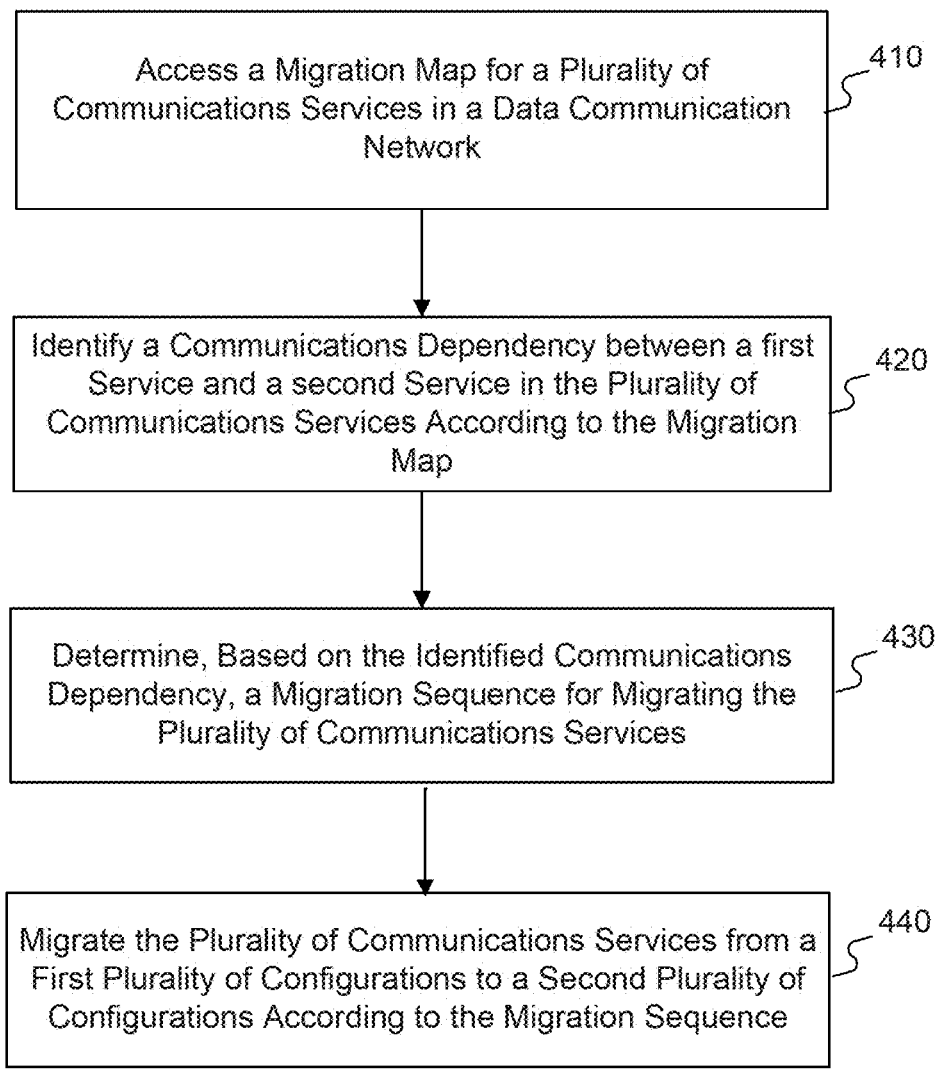
FIG. 4 is a flowchart of an example process for migrating communications services in a data communication network, in accordance with embodiments of the present disclosure.

FIG. 4 is a flowchart of an example process 400 for migrating communications services in a data communication network, in accordance with embodiments of the present disclosure. The steps associated with this example process may be performed by, for example, a processor of the network management system 150 of FIG. 1. The example process 400 allows a service provider to migrate services in a data communication network according to a certain order so as to reduce the disruption of services during the service migration.

In step 410, the network management system accesses a migration map for a plurality of communications services in a data communication network. For example, the migration map may show routes of services before and after the migration. The migration map may also identify resources allocated on paths for services, such as a wavelength configured for the service on the associated service paths. The migration map may be stored in a database connected to the network management system, such as the database 170, or stored locally in the network management system. In some embodiments, the migration map may be generated separately by a network controller based on the QoS requirements of services in the network so as to satisfy the service demands and achieve efficient use of the network. In some embodiments, the migration map may be continuously or periodically updated based on the current network status or the service demands.

In some embodiments, the network management system accesses the migration map in response to a user request to retrieve a sequence of migrations for the services. For example, the user request may be received via the I/O device 250. In other embodiments, the network management system may be configured to access the migration map periodically to identify whether a migration sequence is to be determined. In other embodiments, the network management system may access the migration map in response to receiving a notification that the migration map is updated and/or service migrations are about to occur. The notification may be received from a network controller that allocates routes and resources for services in the network.

In step 420, the network management system identifies a communications dependency between a first service and a second service in the plurality of communications services according to the migration map. For example, the migration map may identify that the first service is configured to migrate from a first route to a second route, the second service is configured to migrate from a third route to a fourth route, and the third route overlaps with the second route. Communications dependency means that a service cannot be moved to its final state (e.g., route and wavelength) until some other service occupying overlapping spans is moved out.

Figure 5:
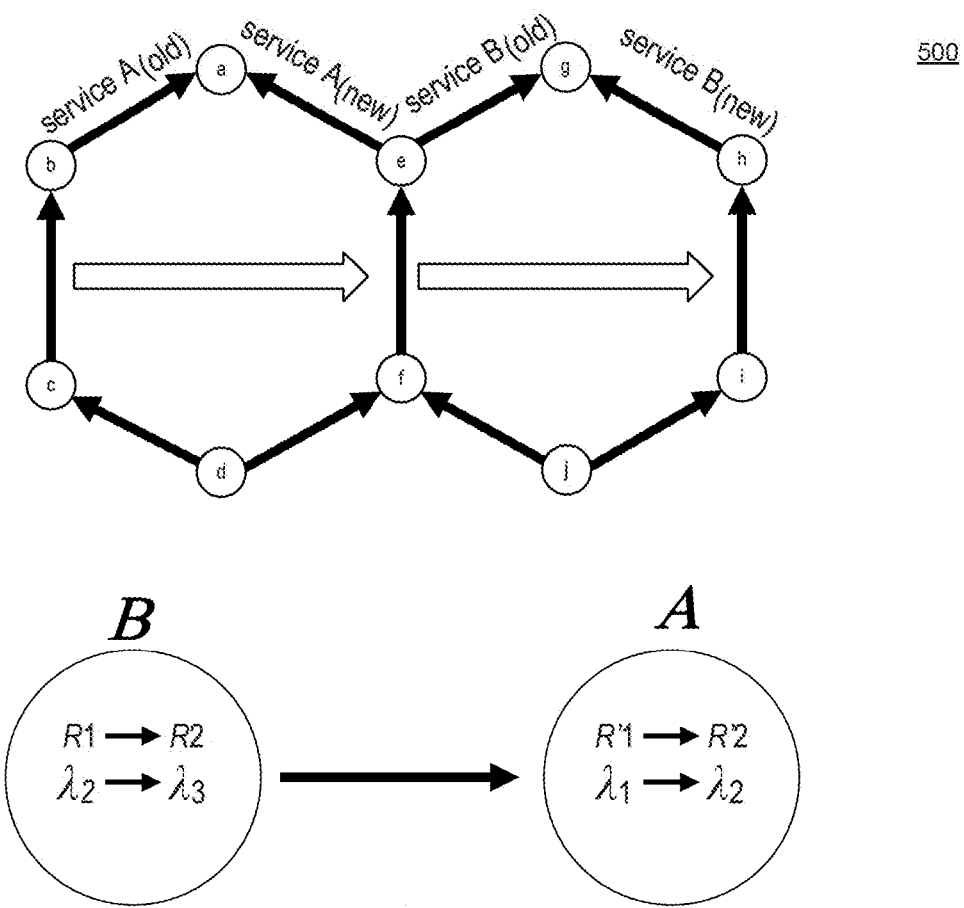
FIG. 5 is a diagram illustrating a process for constructing a dependency graph, in accordance with embodiments of the present disclosure.

FIG. 5 is a diagram illustrating a process 500 for constructing a dependency graph according to a migration map, in accordance with embodiments of the present disclosure. As shown in FIG. 5, before migration, service A is routed along route R'1: d→c→b→a, and service B is routed along route R1: j→f→e→g. After service reconfiguration, service A is rerouted to route R'2: d→f→e→a, and service B is rerouted to route R2: j→i→h→g. In this example, the data communication network is an optical network, where the wavelengths assigned for service A before and after migration are $\lambda_1$ and $\lambda_2$ respectively, and the wavelengths assigned for service B before and after migration are $\lambda_2$ and $\lambda_3$ respectively. Thus, route R'2 for service A overlaps with R1 for service B over the path f→e, and the wavelength assigned for service A after migration is the same as the wavelength assigned for service B before migration. In this case, a directed edge from B to A is added, as shown in FIG. 5. In this embodiment, for any two services α and β in the data communication network, a directed edge from β to α is added if an old route of β before migration overlaps a new route of α after migration. In an optical network, the wavelength assigned to an old route of β before migration equals the wavelength assigned to a new route of α after migration. In doing so, a dependency graph is constructed. The diagrams depicted in FIG. 5 are examples only and are not intended to be limiting.

Referring to FIG. 4, in step 430, the network management system determines, based on the identified communications dependency, a migration sequence for migrating the plurality of communications services in the data communication network. For example, based on the identified communications dependency between services A and B shown in FIG. 5, the network management system determines that migration of service B should occur before migration of service A. Thus, a migration sequence (B, A) can be formed, in which service B is the first to migrate in the migration sequence, and service A is the second to migrate in the migration sequence.

In some embodiments, a dependency graph may be constructed based on the identified communications dependency of service demands in the migration map. To construct a dependency graph, for each service demand, the network management system creates a node $n_i$ in the dependency graph. The network management system then creates a directed edge from node $n_i$ to node $n_j$ if an old route of node $n_i$ before migration overlaps a new route of $n_j$ after migration. In an optical network, a directed edge is created from node $n_i$ to node $n_j$ if the wavelength assigned to an old route of $n_i$ before migration equals the wavelength assigned to a new route of $n_j$ after migration.

Figure 6:
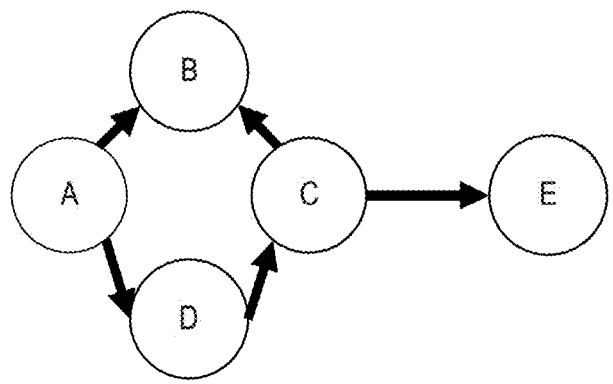
FIG. 6 is an example dependency graph, in accordance with embodiments of the present disclosure.

FIG. 6 is an example dependency graph 600, in accordance with embodiments of the present disclosure. The diagrams depicted in FIG. 6 are examples only and are not intended to be limiting. As shown in FIG. 6, a dependency graph is constructed including service demands A-E. For example, the dependency graph shows directed edges between services A-E, such as edges A→B, A→D, D→C, C→B, and C→E. The directed edges between the services are identified using the method described above in step 420. For example, an edge exists between services A and D and is directed from service A to service D, meaning that an old route of A before migration overlaps a new route of D after migration. In an optical network, the directed edge from service A to service D also means that the wavelength assigned to an old route of A before migration equals the wavelength assigned to a new route of D after migration.

In some embodiments, based on the dependency graph, a migration sequence for services can be acquired according to a topological sort of nodes in the dependency graph. For example, according to the dependency graph shown in FIG. 6, a migration sequence (A, D, C, B, E) can be formed, with service A being the first to migrate in the migration sequence and service E being the last to migrate in the migration sequence. The migration sequence allows the service demands in the network to be migrated smoothly with minimal service disruption.

Referring to FIG. 4, in step 440, the network management system migrates the plurality of communications services from a first plurality of configurations to a second plurality of configurations according to the migration sequence. The configurations for services may include a selected route and/or a wavelength assignment for each service demand. For example, each of the services A-E shown in FIG. 6 may be migrated to a different route according to the order identified in the migration sequence (A, D, C, B, E). Different resources, such as bandwidth, wavelength, time slots, may also be allocated for each of the services after the migration. For example, in an optical network, each of the services A-E shown in FIG. 6 may also be migrated to a different wavelength. By migrating the services according to the migration sequence, the dependency relation among the migrations of service is considered, thereby reducing the service disruption caused by the migration.

In some embodiments, parallel processing can be performed to reduce the time to migrate the services. For example, the network management system may identify the vertices of the dependency graph that have no in-going edges and group them together. The group of vertices may be added to the end of the migration sequence, where migrations of communications services corresponding to the group of vertices can be performed in parallel. The network management system may then delete the group of vertices from the dependency graph and repeat the above steps until no more vertices remain in the dependency graph.

Figure 7:
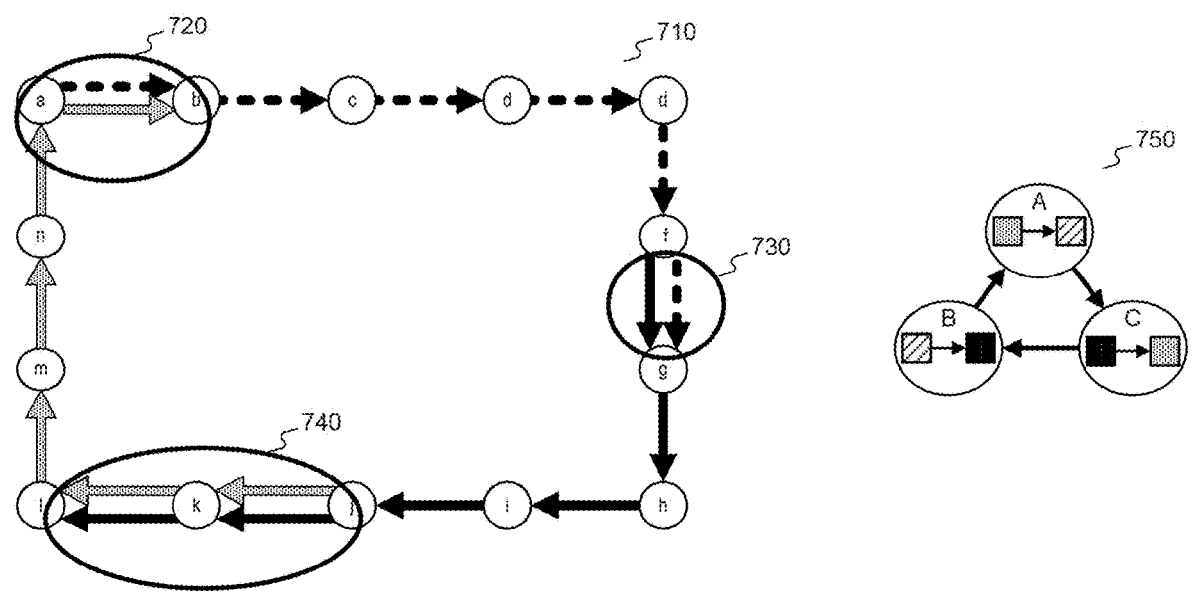
FIG. 7 is a diagram illustrating a dependency cycle, in accordance with embodiments of the present disclosure.

In some data communication networks, the dependency graph may include one or more cycles, where a dependency cycle starts and ends on the same service, making it difficult to determine the migration sequence based on the dependency graph. FIG. 7 is a diagram illustrating a dependency cycle in a data communication network, in accordance with embodiments of the present disclosure. The example diagram depicted in FIG. 7 is an example only and is not intended to be limiting.

As shown in FIG. 7, the left diagram illustrates a network graph 710 including nodes a-n and connectivity between the nodes a-n. Services A, B, C are provided by the network, where service A<j, b> is from source node "j" to destination node "b", service B<a, g> is from source node "a" to destination node "g", and service C<f, l> is from source node "f" to destination node "l". As shown in FIG. 7, path 720, a→b, is an overlapping path between service A and service B, path 730, f→g, is an overlapping path between service B and service C, and path 740, j→l, is an overlapping path between service A and service C. In this example, service A is to be migrated to another wavelength that is the same as a wavelength configuration for service B before migration of service B, service B is to be migrated to another wavelength that is the same as a wavelength configuration for service C before migration of service C, and service C is to be migrated to another wavelength that is the same as a wavelength configuration for service A before migration of service A. As a result, a cycle is formed in the corresponding dependency graph 750, with directed edges from service B to service A, service C to service B, and service A to service C. The dependency cycle presents a deadlock condition such that it is difficult to determine the migration sequence of services A, B, C based on the dependency graph 750. For example, if a migration sequence (A, C, B) is used, service A cannot migrate to the new wavelength without first migrating service C out of its old wavelength, causing a disruption of service A.

Figure 8:
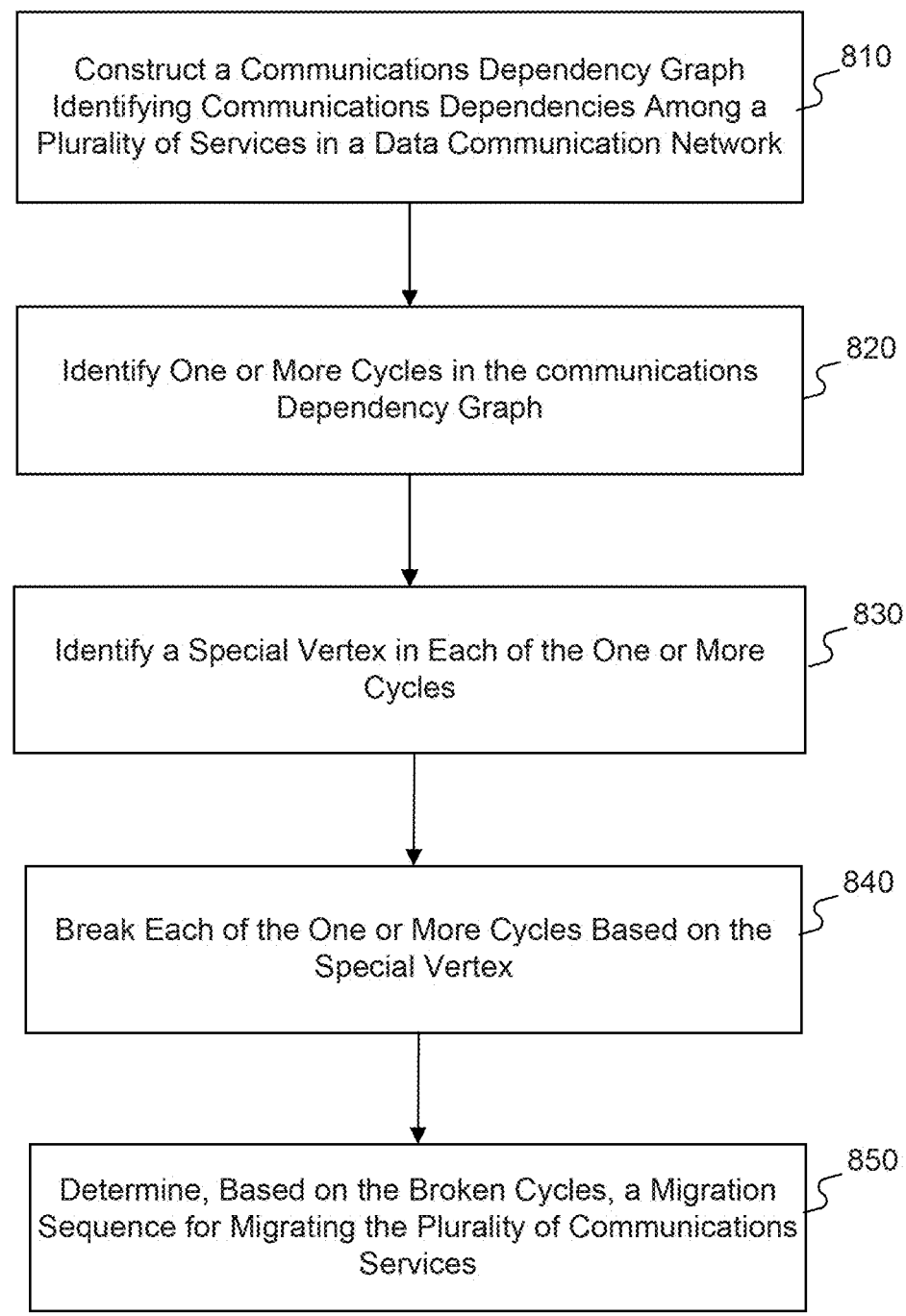
FIG. 8 is a flowchart of an example process for migrating communications services in a data communication network, consistent with the disclosed embodiments.

FIG. 8 is a flowchart of an example process 800 for migrating communications services in a data communication network, consistent with the disclosed embodiments. The steps associated with this example process may be performed by, for example, a processor of the network management system 150 of FIG. 1. The example process 800 provides a method to migrate services in a data communication network when there are one or more cycles in the dependency graph of the services.

In step 810, the network management system constructs a communications dependency graph identifying communications dependencies among a plurality of services in a data communication network. For example, the method described above in connection with FIGS. 4 and 5 can be used to construct the communications dependency graph. The communications dependency graph includes a plurality of vertices, each of the plurality of vertices corresponding to a pre-migration configuration and a post-migration configuration of a service in the data communication network. In this disclosure, the terms "node" and "vertex" may be used interchangeably. For each service demand $d_i$ in the data communication network, a corresponding node $n_i$ is created in the communications dependency graph. A directed edge from node $n_i$ to node $n_j$ is created in the communications dependency graph if the current pre-migration route of service $d_i$ overlaps with the final post-migration route of service $d_j$ in the migration map. In an optical network, to create a directed edge from node $n_i$ to node $n_j$, it may also be required that the current pre-migration wavelength assignment of service $d_i$ be the same as the final post-migration wavelength assignment of service $d_j$.

In step 820, the network management system identifies one or more cycles in the communications dependency graph. For example, like the cycle 750 shown in FIG. 7, each of the cycles may include at least three vertices corresponding to at least three services in the plurality of communications services. In some implementations, the network management system may look for a cycle that starts and ends on the same vertex to detect the cycle. If no cycle is detected in the dependency graph, the network management system may determine a migration sequence according to the method described in connection with FIG. 4.

In step 830, the network management system identifies a special vertex in each of the one or more cycles. For example, the network management system may identify node A in the dependency cycle 750 of FIG. 7 as a special vertex. As another example, the network management system may identify node B in the dependency cycle 750 of FIG. 7 as a special vertex. In some embodiments, a node corresponding to a service that can be delivered using a temporary wavelength different from the pre-migration wavelength and post-migration wavelength may be selected as the special vertex. The process 800 does not limit how a special vertex is chosen in a dependency cycle.

Figure 9:
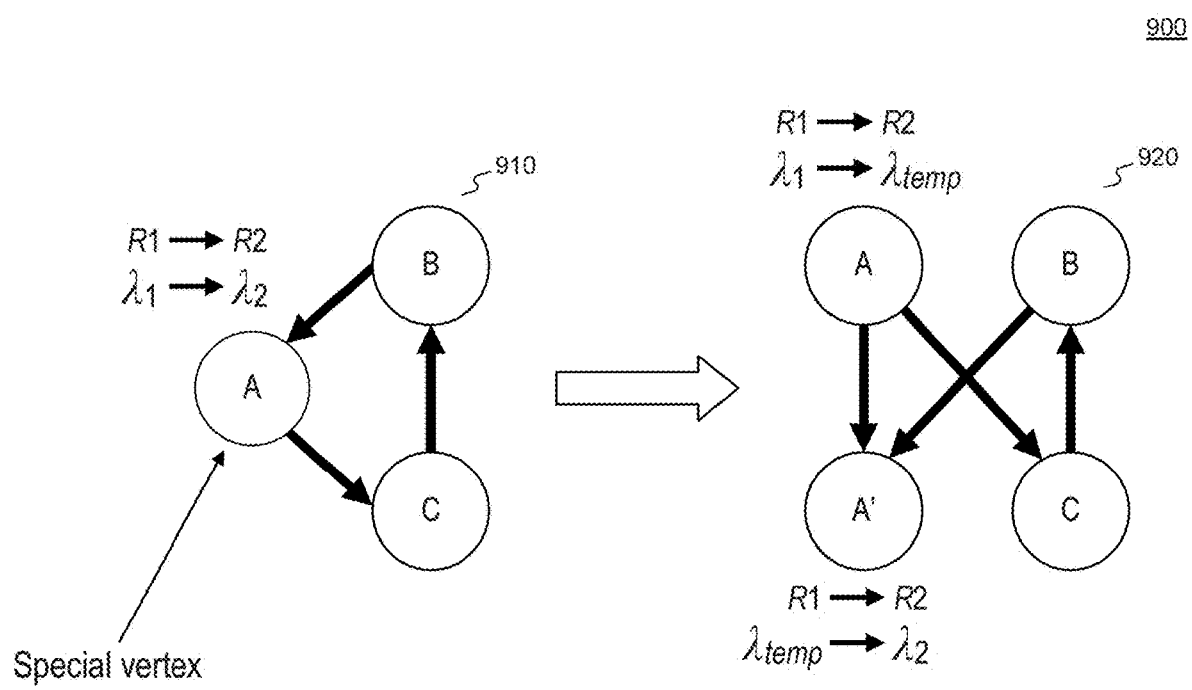
FIG. 9 is a diagram illustrating a process for breaking a dependency cycle, in accordance with embodiments of the present disclosure.

In step 840, the network management system breaks each of the one or more cycles based on the special vertex. FIG. 9 is a diagram illustrating a process 900 for breaking a dependency cycle, in accordance with embodiments of the present disclosure. As shown in the left diagram of FIG. 9, node A in the dependency cycle 910 is identified as the special vertex, where node A corresponds to service A with a pre-migration configuration of route $R_1$ with wavelength $\lambda_1$ and a post-migration configuration of route $R_2$ with wavelength $\lambda_2$. After identifying the special vertex, a temporary wavelength may be used to break the dependency cycle 910. As shown in the right diagram of FIG. 9, node A is first migrated to a temporary wavelength $\lambda_{temp}$, and an additional node A' may be added to the dependency graph. The additional node A' corresponds to a pre-migration configuration of route $R_1$ with wavelength $\lambda_{temp}$ and a post-migration configuration of route R2 with wavelength $\lambda_2$. A directed edge from A to A' may also be added in the acyclic dependency graph 920. In doing so, the dependency cycle is broken into an acyclic dependency graph 920, and a migration sequence may be determined based on the acyclic dependency graph 920. When the dependency graph includes multiple cycles, each of the cycles can be broken into an acyclic dependency graph using the above-described process.

In step 850, the network management system determines, based on the broken cycles, a migration sequence for migrating the plurality of communications services. For example, after the dependency cycle 910 in the left diagram of FIG. 9 is broken into the acyclic dependency graph 920, a migration sequence (A, C, B, A') may be determined according to the topological sort of the acyclic dependency graph 920. In the migration sequence (A, C, B, A'), service A is moved twice, the first time being migrated to a temporary wavelength and the second time being migrated to the final post-migration route and wavelength of service A. By using the temporary wavelength to break the dependency cycle and determine a migration sequence, the deadlock condition of the dependency cycle is resolved, and the services can transition to the post-migration configurations smoothly with minimal service disruption.

Service Migration with Limited Number of Allowed Cycle Breaks

As described above in connection with FIGS. 7-9, when a communications dependency graph includes one or more cycles, a special vertex can be identified for each of the one or more cycles, which is then broken into an acyclic dependency graph based on the corresponding special vertex. During this process, the service at a special vertex is first temporarily migrated to a temporary configuration (e.g., a temporary wavelength or a temporary service route). However, in some embodiments, the number of the cycles in a communications dependency graph is more than the number of special vertices and/or the number of temporary configurations that are allowed to be used. For example, the number of temporary wavelengths available in the network may be less than the number of cycles. Therefore, in these embodiments, there is a need for the network management system to determine the maximum number of services that can be migrated, given the number of allowed temporary routes.

Figure 10:
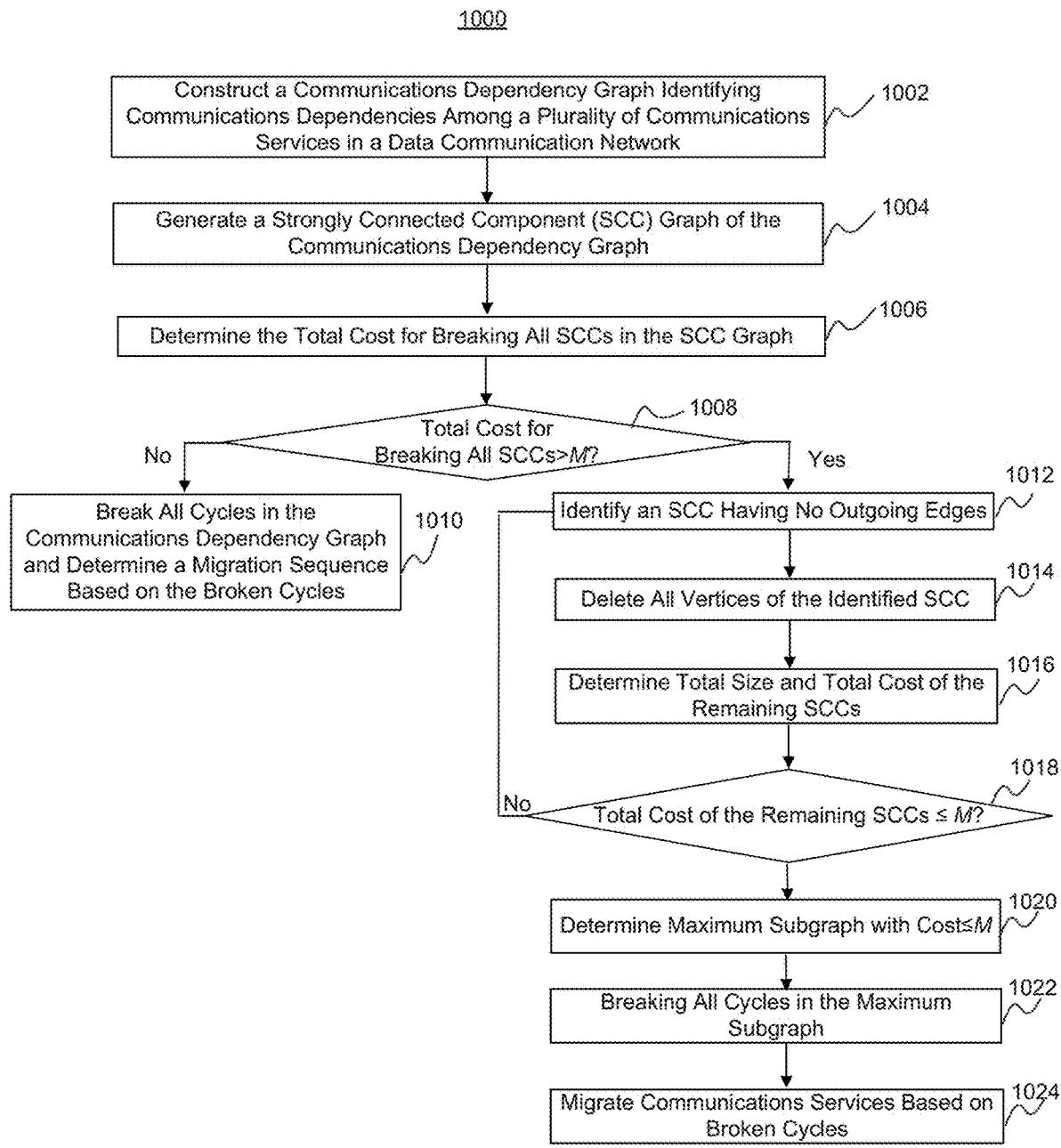
FIG. 10 is a flowchart of an example process for migrating communications services in a data communication network that only allows a limited number of cycle breaks, consistent with the disclosed embodiments.

FIG. 10 is a flowchart of an example process 1000 for migrating communications services in a data communication network that only allows a limited number of cycle breaks, consistent with the disclosed embodiments. The steps associated with this example process may be performed by, for example, a processor of the network management system 150 of FIG. 1. The example process 1000 can be used to migrate services in a data communication network when the dependency graph of the services contains more cycles than the number of allowed cycle breaks. In particular, the example process 1000 provides a method for migrating a maximum number of communications services under a constraint on the number of allowed cycle breaks.

In step 1002, the network management system constructs a communications dependency graph identifying communications dependencies among a plurality of communications services in a data communication network. This step is similar to step 810 (FIG. 8). The constructed communications dependency graph includes a plurality of vertices, each of the plurality of vertices corresponding to a pre-migration configuration (e.g., a service route before migration) and a post-migration configuration (e.g., a service route after migration) of a service in the data communication network. Among the plurality of vertices, if a pre-migration configuration of a first vertex at least partially overlaps with a post-migration configuration of a second vertex, a directed edge is created from the first vertex to the second vertex to indicate the dependency of the second vertex on the first vertex. When the network is an optical network, for example, the pre-migration configuration of the first vertex and the post-migration configuration of the second vertex also share the same wavelength or the same set(s) of wavelengths. That is, when the communications dependency graph represents an optical network, the pre-migration configuration of the first vertex and the post-migration configuration of the second vertex not only partially overlaps in their service routes, but also uses at least one common wavelength.

Figure 11:
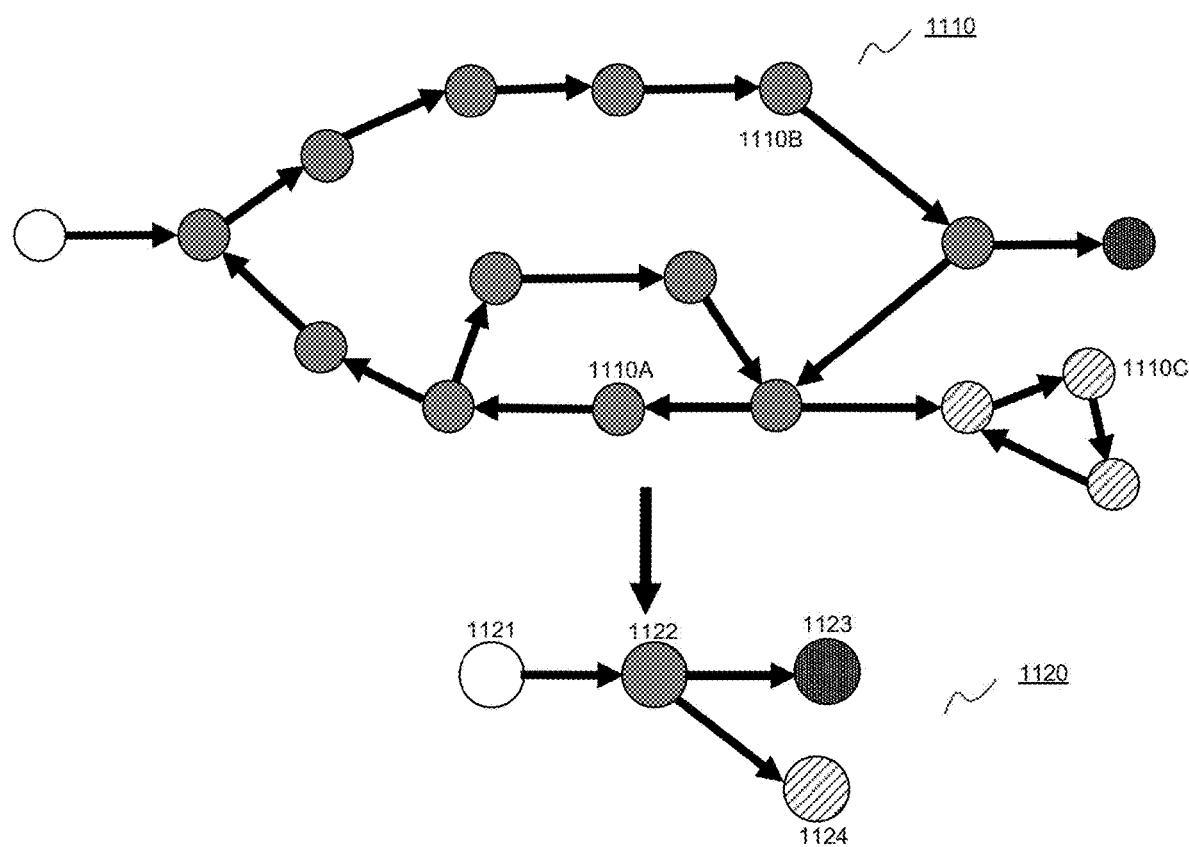
FIG. 11 is a diagram illustrating an example process of generating a strongly connected component (SCC) graph of a communications dependency graph, consistent with the disclosed embodiments.

The communications dependency graph may include one or more cycles. For example, FIG. 11 illustrates a communications dependency graph 1110 of a data communication network, in accordance with embodiments of the present disclosure. As shown in FIG. 11, the communications dependency graph 1110 contains a plurality of cycles.

Referring back to FIG. 10, in step 1004, the network management system generates a strongly connected component (SCC) graph based on the communications dependency graph. The example process 1000 uses SCCs to find a solution to migrate the maximum number of services when the communications dependency graph contains more cycles than the number of allowed cycle breaks. In the disclosed embodiments, an SCC graph can include one or more SCCs. An SCC is defined as a part of the communications dependency graph in which any two vertices are connected by a directed path in each direction between the two vertices. That is, for any two vertices in an SCC, there are (1) a first directed path from a first one of the two vertices to a second one of the two vertices, and (2) a second directed path from a second vertex to the first vertex. These directed paths are formed by the directed edges present in the communications dependency graph.

Moreover, in the disclosed embodiments, any two vertices that are connected by a directed path in each direction can be assigned to the same SCC. That is, on an SCC graph, any two vertices in two different SCCs respectively are not connected by a directed path in at least one direction between the two vertices.

Thus, in generating the SCC graph, the network management system may examine each pair of vertices in the communications dependency graph. If the communications dependency graph contains a directed path in each direction between the pair of vertices, the network management system assigns the pair of vertices to the same SCC. But if there is no directed path in at least one direction between the pair of vertices, the network management system assigns the pair of vertices to two different SCCs, respectively. After all the vertices in the communications dependency graph are assigned to their respective SCCs, the network management system generates an SCC graph based on the SCCs.

For example, FIG. 11 also illustrates a process of generating an SCC graph 1120 based on the communications dependency graph 1110, in accordance with embodiments of the present disclosure. As illustrated by the SCC graph 1120, an SCC is also represented by vertices and directed edges. However, unlike those used in a communications dependency graph, a vertex in an SCC graph indicates an SCC that includes one or more vertices of the corresponding communications dependency. Moreover, an edge in the SCC graph connecting a first SCC to a second SCC represents the existence of one or more edges in the dependency graph from vertices in the first SCC to vertices of the second SCC.

FIG. 11 illustrates a process consistent with the above description regarding generating an SCC graph based on a communications dependency graph. For example, vertices 1110A and 1110B in the communication dependency graph 1110 are included in the same SCC 1122 because there is a first directed path from vertex 1110A to vertex 1110B, and a second directed path from vertex 1110B to vertex 1110A. In contrast, vertices 1110A and 1110C belong to different SCCs in the SCC graph 1120 because, although there is a directed path from vertex 1110A to vertex 1110C, there is no directed path from vertex 1110C to vertex 1110A.

Referring back to FIG. 10, in step 1006, the network management system determines a total cost for breaking all the SCCs in the SCC graph. In the present disclosure, a cost for breaking an SCC is defined as the number of special vertices needed to break all the circles in the SCC. For example, in the example shown in FIG. 11, only one special vertex (e.g., vertex 1110A) is needed to break all the cycles in SCC 1122. Therefore, the cost for breaking SCC 1122 is 1. In the disclosed embodiments, the network management system may first identify the special vertices needed for breaking all the cycles in each of the SCCs, and then add up the numbers of the identified special vertices to obtain the total cost for breaking all the SCCs in the SCC graph.

With reference to FIG. 10, in step 1008 the network management system compares the total cost for breaking all the SCCs in the SCC graph to the maximum number of cycle breaks allowed in the communications dependency graph. In the following description, the maximum number of allowed cycle breaks is referred to as "M." In other words, within the plurality of communications services represented by the communications dependency graph, no more than M communications services are allowed to migrate from pre-migration configurations to temporary configurations, before migrating to their post-migration configurations. According to the disclosed embodiments, if the total cost for breaking all the SCCs in the SCC graph is less than or equal to M, the network management system proceeds to perform step 1010. If the total cost for breaking all the SCCs in the SCC graph is larger than M, the network management system proceeds to perform step 1012.

In step 1010, the network management system breaks all the cycles in the communications dependency graph. According to some exemplary embodiments, the network management system breaks each of the cycles based on the identified special vertices, and determines, based on the broken cycles, a migration sequence for migrating the plurality of communications services. The details of these operations are similar to those described in relation to the process 800 (FIG. 8), as discussed above.

In step 1012, the network management system identifies, among the SCCs in the SCC graph, an SCC that has no outgoing edges. As used in the process 1000, an "outgoing edge" of an SCC is an edge directed from vertices in the SCC to vertices not in the SCC. Thus, an SCC without outgoing edges is an SCC that has no edges extending from the SCC to vertices not in the SCC.

In step 1014, the network management system deletes the SCC identified in step 1012 from the SCC graph. In other words, the network management system deletes all the vertices in the identified SCC from the communications dependency graph.

In step 1016, the network management system determines the number of vertices in the remaining SCCs and a total cost for breaking the remaining SCCs. To determine the number of vertices in the remaining SCCs, the network management system may determine the size of each SCC in the SCC graph. As used in the present disclosure, the "size" of an SCC means the number of vertices in the SCC. The network management system may then add up the sizes of the all the remaining SCCs to determine the total size of the remaining SCCs (i.e., the number of vertices in the remaining SCCs). Moreover, to determine the total cost for breaking the remaining SCCs, the network management system may add up the costs of the remaining SCCs (i.e., the numbers of special vertices identified in step 1006 for each of the remaining SCCs).

In step 1018, the network management system determines whether the total cost for breaking the remaining SCCs is equal to or less than M. If the total cost for breaking the remaining SCCs is larger than M, the network management system repeats steps 1012-1016. If the total cost for breaking the remaining SCCs is equal to or less than M, the network management system stops the iteration.

Moreover, if in step 1012 there are more than one SCCs without outgoing edges, the above steps 1012-1018 may be performed for each of the SCCs without outgoing edges.

After the above described iterations of steps 1012-1018 are completed, in step 1020 the network management system determines a set of remaining SCCs that has the most vertices and has a total cost equal to or less than M. This set of SCCs constitutes a maximum subgraph of the communications dependency graph that requires no more than M cycle breaks.

Figure 12:
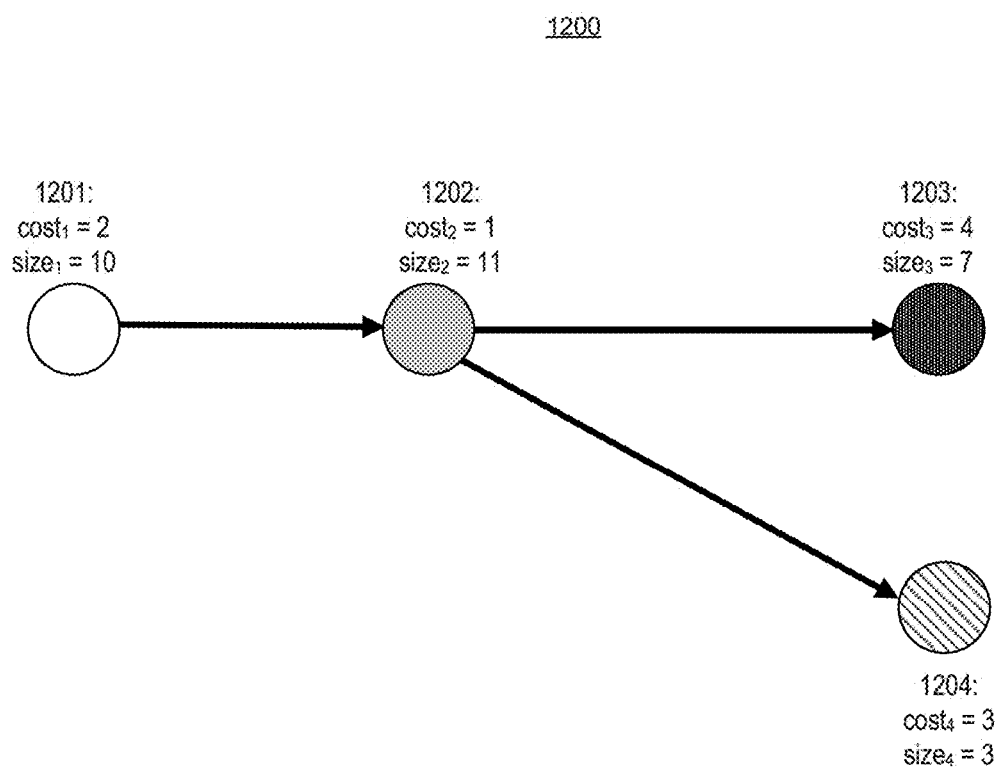
FIG. 12 is a diagram illustrating an example process for determining a maximum subgraph of a communications service graph that requires no more than a predetermined number of cycle breaks, consistent with the disclosed embodiments.

FIG. 12 is a graph illustrating exemplary operations in steps 1012-1018, consistent with the disclosed embodiments. As shown in FIG. 12, an SCC graph 1200 has four SCCs 1201-1204 and allows no more than 7 cycle breaks. The cost and size of each of the four SCCs 1201-1204 are also shown in FIG. 12. SCCs 1203 and 1204 have no outgoing edges. If SCC 1203 is deleted, the remaining SCCs have a total size of 24 and a total cost of 6. If SCC 1204 is deleted, the remaining SCCs have a total size of 28 and a total cost of 7. Therefore, SCCs 1201, 1202, and 1203 constitute the maximum subgraph that requires no more than the number of allowed cycle breaks.

Referring again to FIG. 10, in step 1022 the network management system breaks all the cycles in the determined maximum subgraph. In particular, the network management system may break each cycle in the determined maximum subgraph into an acyclic dependency graph, based on special vertices in the set of remaining SCCs that have the most vertices and have a total cost equal to or less than M.

In step 1024, the network management system migrates the communication services corresponding to the vertices in the determined maximum subgraph. For example, the network management system may determine a migration sequence of the communications services based on a topological sort of the acyclic dependency graph(s) determined in step 1022, and migrate the communications service according to the migration sequence.

In some embodiments, no cycle breaking is allowed by the plurality of communications services represented by the communications dependency graph. For example, there may be no extra wavelength available for use as a temporary wavelength. As another example, the services may be restricted from using any unspecified, temporary wavelength. In these embodiments, to migrate as many services as possible without breaking any cycles, the network management system may create an SCC graph of the communications dependency graph and then delete, from the SCC graph, all SCCs having non-zero costs and any SCC connected by a directed path from the SCCs having no-zero costs. After the deletion, the vertices in the remaining SCCs do not form any cycles. The network management system can migrate the remaining vertices according to the communications dependency graph.

Figure 13:
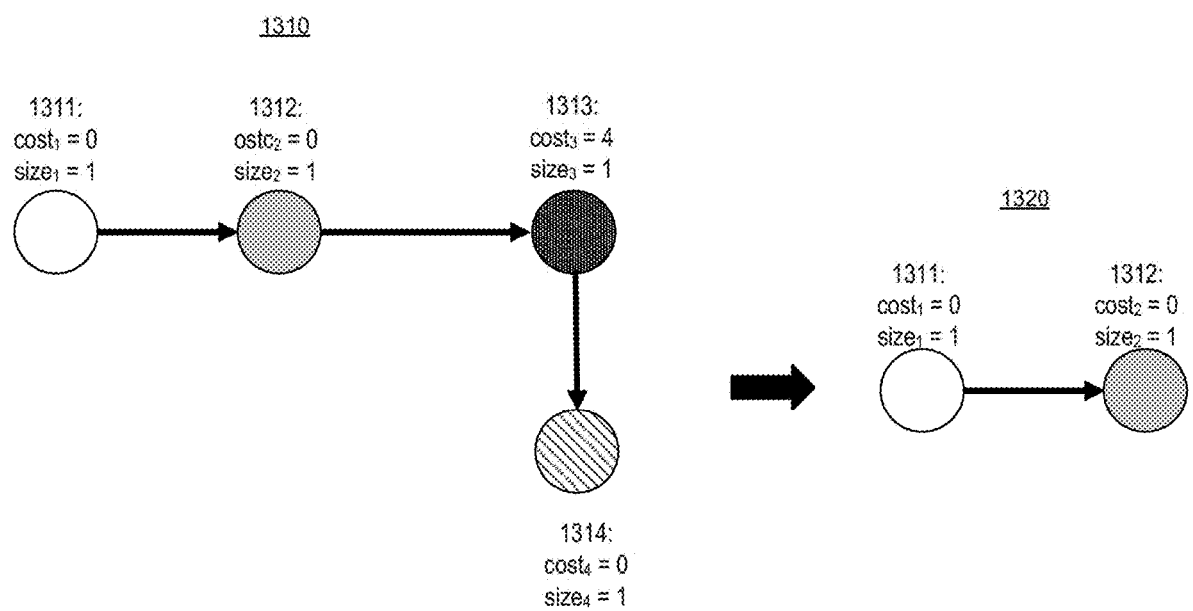
FIG. 13 is a diagram illustrating a process for determining a maximum subgraph of a communications service graph that requires no cycle break, consistent with the disclosed embodiments.

For example, FIG. 13 illustrates an exemplary process for migrating a maximum number of communications services in a communications dependency graph without breaking any cycles, according to the disclosed embodiments. As shown in FIG. 13, an SCC graph 1310 has four SCCs 1301-1304 and does not allow any cycle breaks. The cost and size of each of the four SCCs 1301-1304 are also shown in FIG. 13. SCC 1313 has a non-zero cost. Moreover, there is a directed path from SCC 1313 to SCC 1314. Therefore, SCCs 1313 and 1314 can be deleted from SCC graph 1310. The resultant SCC graph 1320 only contains SCCs 1311 and 1312 and includes the most communications services that can be migrated without breaking any cycles.

Service Migration without Exceeding Capacity Constraints on Migration Paths

In the example described above in connection with FIG. 3, it is assumed that two different services cannot use the same path simultaneously (e.g., the path f→e in FIG. 3 does not carry both services A and B at the same time). However, in some embodiments consistent with the present disclosure, one path may carry two or more services at the same time, as long as the path has enough resources (e.g., bandwidth, wavelength, time slots, etc.) to support the two or more services.

Moreover, in the above description regarding step 430 of the example process 400 (FIG. 4), the capacity limit (i.e., maximum capacity) of each path may not be considered in determining the migration sequence. In the present disclosure, the capacity limit of a path is defined as the maximum amount of resources (e.g., bandwidth, wavelength, time slots, etc.) that can be provided by the path. Therefore, only service demands less than or equal to the capacity limit can be supported by the path. This could have an impact on the actual migration sequence allowed by the data communication network. For example, the example migration sequence (A, D, C, B, E) provided in the above description in connection with step 430 (FIGS. 4 and 6) may exceed the capacity limit(s) of one or more paths, and thus may be disallowed. The allowed migration sequence instead may be (A, D, C, E, B).

Therefore, in some embodiments consistent with the present disclosure, there is a need to determine the migration sequence under the constraint posed by the maximum capacities of the migration paths. The following is a description about the disclosed process for determining a migration sequence that does not exceed the maximum capacities of the migration paths.

Figure 14:
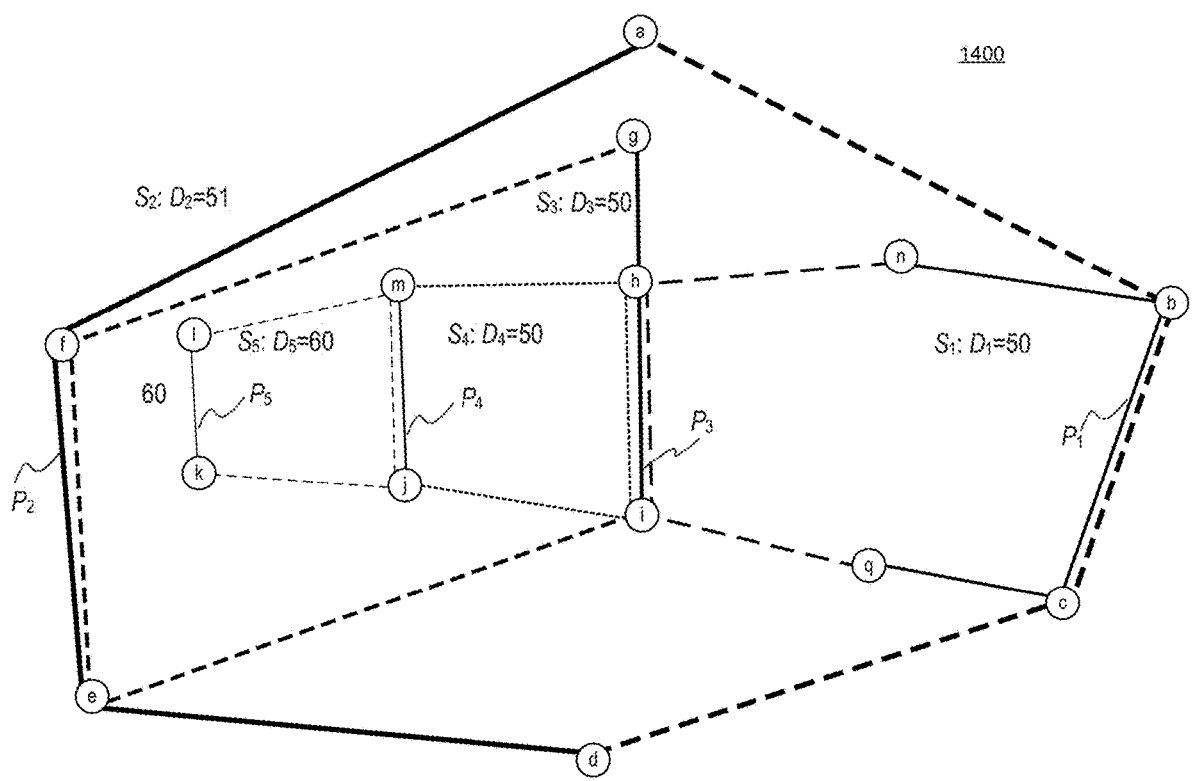
FIG. 14 is a diagram of an example service migration map, consistent with the present disclosure.

FIG. 14 is a diagram of an example service migration map 1400, consistent with the present disclosure. As shown in FIG. 14, the service migration map 1400 represents a data communication network that includes a plurality of network nodes a, b, c, d, e, f, . . . . As discussed earlier, a network node refers to a network component, such as network devices 120, that communicates with one another according to predetermined protocols by means of wired or wireless communication links. Each pair of adjacent network nodes can form a path for migrating services.

Still referring to FIG. 14, the data communication network further includes at least services $S_1$, $S_2$, $S_3$, $S_4$, and $S_5$. Each of the five services corresponds to an old route (represented by solid lines in FIG. 14) before migration and a new route (represented by dash lines in FIG. 14) after migration. Moreover, each of the services requires a certain amount of resources (e.g., bandwidth, wavelength, time slots, etc.). Table 1 below summarizes the route information of and the resources demanded by the services $S_1$, $S_2$, $S_3$, $S_4$, and $S_5$. For example, as shown in Table 1, service $S_1$ is routed alone q→c→b→n before migration and rerouted to q→i→h→n after migration. Moreover, the amount of resources required by service $S_1$ is 50. The number "50" is for illustrative purpose only and is proportional to the quantity of actual resources (e.g., bandwidth, wavelength, time slots, etc.) required by service $S_1$.

TABLE 1

Service Demands and Associated Route Information

| Service | Demand | Old Route | New Route |
|---------|--------|-----------|-----------|
| $S_1$ | $D_1$ = 50 | q –> c –> b –> n | q –> i –> h –> n |
| $S_2$ | $D_2$ = 51 | d –> e –> f –> a | d –> c –> b –> a |
| $S_3$ | $D_3$ = 50 | i –> h –> g | i –> e –> f –> g |
| $S_4$ | $D_4$ = 50 | j –> m | j –> i –> h –> m |
| $S_5$ | $D_5$ = 60 | k –> l | k –> j –> m –> l |

Moreover, consistent with the disclosed embodiments, each path in the data communication network may have a predetermined capacity limit—the maximum amount of resources that a path can provide at any given time. For example, FIG. 14 shows five paths $P_1$ (c↔b), $P_2$ (e↔f), $P_3$ (i↔h), $P_4$ (j↔m), and $P_5$ (k↔l), each of which has a maximum capacity of 100. Before migration, the services $S_1$, $S_2$, $S_3$, $S_4$, and $S_5$ each occupy the paths $P_1$, $P_2$, $P_3$, $P_4$, and $P_5$, respectively. Therefore, the service loads on the five paths are equal to the amounts of resources required by the five services, respectively. Table 2 below summarizes the loads (denoted by "L") on and the remaining free capacities (denoted by "F") of the five paths before any of the services $S_1$, $S_2$, $S_3$, $S_4$, and $S_5$ is migrated.

TABLE 2

Loads and Remaining Fee Capacities Before Migration

| Path | Load | Remaining Free Capacity |
|------|------|------------------------|
| $P_1$ | $L_1$ = 50 | $F_1$ = 50 |
| $P_2$ | $L_2$ = 51 | $F_2$ = 49 |
| $P_3$ | $L_3$ = 50 | $F_3$ = 50 |
| $P_4$ | $L_4$ = 50 | $F_4$ = 50 |
| $P_5$ | $L_5$ = 60 | $F_5$ = 40 |

Consistent with the disclosed embodiments, any legal (i.e., allowable) service migration in the data communication network cannot cause the capacity limit of each path to be exceeded. That is, any legal migration sequence for the five services $S_1$, $S_2$, $S_3$, $S_4$, and $S_5$ cannot exceed the capacity limits of the paths $P_1$, $P_2$, $P_3$, $P_4$, and $P_5$.

For example, still referring to FIG. 14, if the service $S_1$ is the first service to be migrated in the migration sequence, the changes to the loads on the paths $P_1$, $P_2$, $P_3$, $P_4$, and $P_5$ are as follows:

$$\Delta L(P_1) = -D_1 = -50,$$

$$\Delta L(P_2) = 0,$$

$$\Delta L(P_3) = D_1 = 50,$$

$$\Delta L(P_4) = 0,$$

$$\Delta L(P_5) = 0,$$

where a positive change means the load on a path is increased, a negative change means the load on a path is decreased, and a zero change means there is no change to the load on a path. Therefore, the remaining free capacities of the five paths are the following:

$$F_m(P_1) = F_0(P_1) - \Delta L(P_1) = 50 - (-50) = 100,$$

$$F_m(P_2) = F_0(P_2) - \Delta L(P_2) = 49 - 0 = 49,$$

$F_m(P_3)=F_0(P_3)-\Delta L(P_3)=50-50=0$, $F_m(P_4)=F_0(P_4)-\Delta L(P_4)=50-0=50$, $F_m(P_5)=F_0(P_5)-\Delta L(P_5)=40-0=40$, where "$F_0$" denotes the remaining free capacity before the service migration and "$F_m$" denotes the remaining free capacity after the service migration. Because none of the remaining free capacities after the migration is a negative number, the migration of service S i does not exceed the capacity limits of the paths. Accordingly, service $S_1$ can be the first service to be migrated.

As another example, if the service $S_2$ is the first service to be migrated in the migration sequence, the changes to the loads on the paths $P_1$, $P_2$, $P_3$, $P_4$, and $P_5$ are as follows:

$\Delta L(P_1)=51$, $\Delta L(P_2)=-D_2=-51$, $\Delta L(P_3)=D_2=0$, $\Delta L(P_4)=0$, $\Delta L(P_5)=0$.

Therefore, the remaining free capacities of the five paths are the following:

$F_m(P_1)=F_0(P_1)-\Delta L(P_1)=50-51=-1$, $F_m(P_2)=F_0(P_2)-\Delta L(P_2)=49-(-51)=100$, $F_m(P_3)=F_0(P_3)-\Delta L(P_3)=50-0=50$, $F_m(P_4)=F_0(P_4)-\Delta L(P_4)=50-0=50$, $F_m(P_5)=F_0(P_5)-\Delta L(P_5)=40-0=40$, Because the remaining free capacity of the path $P_1$ after the migration is a negative number, the migration of service $S_2$ would cause the capacity limit of the path $P_1$ to be exceeded. Accordingly, service $S_2$ cannot be the first service to be migrated.

As another example, if the service $S_3$ is the first service to be migrated in the migration sequence, the changes to the loads on the paths $P_1$, $P_2$, $P_3$, $P_4$, and $P_5$ are as follows:

$\Delta L(P_1)=0$, $\Delta L(P_2)=D_3=50$, $\Delta L(P_3)=-D_3=-50$, $\Delta L(P_4)=0$, $\Delta L(P_5)=0$.

Therefore, the remaining free capacities of the five paths are the following:

$F_m(P_1)=F_0(P_1)-\Delta L(P_1)=50-0=50$, $F_m(P_2)=F_0(P_2)-\Delta L(P_2)=49-50=-1$, $F_m(P_3)=F_0(P_3)-\Delta L(P_3)=50-(-50)=100$, $F_m(P_4)=F_0(P_4)-\Delta L(P_4)=50-0=50$, $F_m(P_5)=F_0(P_5)-\Delta L(P_5)=40-0=40$, Because the remaining free capacity of the path $P_2$ after the migration is a negative number, the migration of service $S_3$ would cause the capacity limit of the path $P_2$ to be exceeded. Accordingly, service $S_3$ cannot be the first service to be migrated.

As another example, if the service $S_4$ is the first service to be migrated in the migration sequence, the changes to the loads on the paths $P_1$, $P_2$, $P_3$, $P_4$, and $P_5$ are as follows:

$\Delta L(P_1)=0$, $\Delta L(P_2)=0$, $\Delta L(P_3)=D_4=50$, $\Delta L(P_4)=-D_4=-50$, $\Delta L(P_5)=0$.

Therefore, the remaining free capacities of the five paths are the following:

$F_m(P_1)=F_0(P_1)-\Delta L(P_1)=50-0=50$, $F_m(P_2)=F_0(P_2)-\Delta L(P_2)=49-0=49$, $F_m(P_3)=F_0(P_3)-\Delta L(P_3)=50-50=0$, $F_m(P_4)=F_0(P_4)-\Delta L(P_4)=50-(-50)=100$, $F_m(P_5)=F_0(P_5)-\Delta L(P_5)=40-0=40$, Because none of the remaining free capacities after the migration is a negative number, the migration of service $S_4$ does not exceed the capacity limits of the paths. Accordingly, service $S_4$ can be the first service to be migrated.

As yet another example, if the service $S_5$ is the first service to be migrated in the migration sequence, the changes to the loads on the paths $P_1$, $P_2$, $P_3$, $P_4$, and $P_5$ are as follows:

$\Delta L(P_1)=0$, $\Delta L(P_2)=0$, $\Delta L(P_3)=0$, $\Delta L(P_4)=D_5=60$, $\Delta L(P_5)=-D_5=-60$.

Therefore, the remaining free capacities of the five paths are the following:

$F_m(P_1)=F_0(P_1)-\Delta L(P_1)=50-0=50$, $F_m(P_2)=F_0(P_2)-\Delta L(P_2)=49-0=49$, $F_m(P_3)=F_0(P_3)-\Delta L(P_3)=50-0=50$, $F_m(P_4)=F_0(P_4)-\Delta L(P_4)=50-60=-10$, $F_m(P_5)=F_0(P_5)-\Delta L(P_5)=40-(-60)=100$, Because the remaining free capacity of the path $P_4$ after the migration is a negative number, the migration of service $S_5$ would cause the capacity limit of the path $P_4$ to be exceeded. Accordingly, service $S_5$ cannot be the first service to be migrated.

As illustrated above, service $S_1$ or service $S_4$ can be migrated at the first step of a legal migration sequence, without exceeding the capacity limits imposed on the paths $P_1$, $P_2$, $P_3$, $P_4$, and $P_5$. According to some embodiments, a similar process can be used to examine which remaining services can be migrated after service $S_1$ or $S_4$ is migrated, without exceeding the capacity limit of each path.

Figure 15:
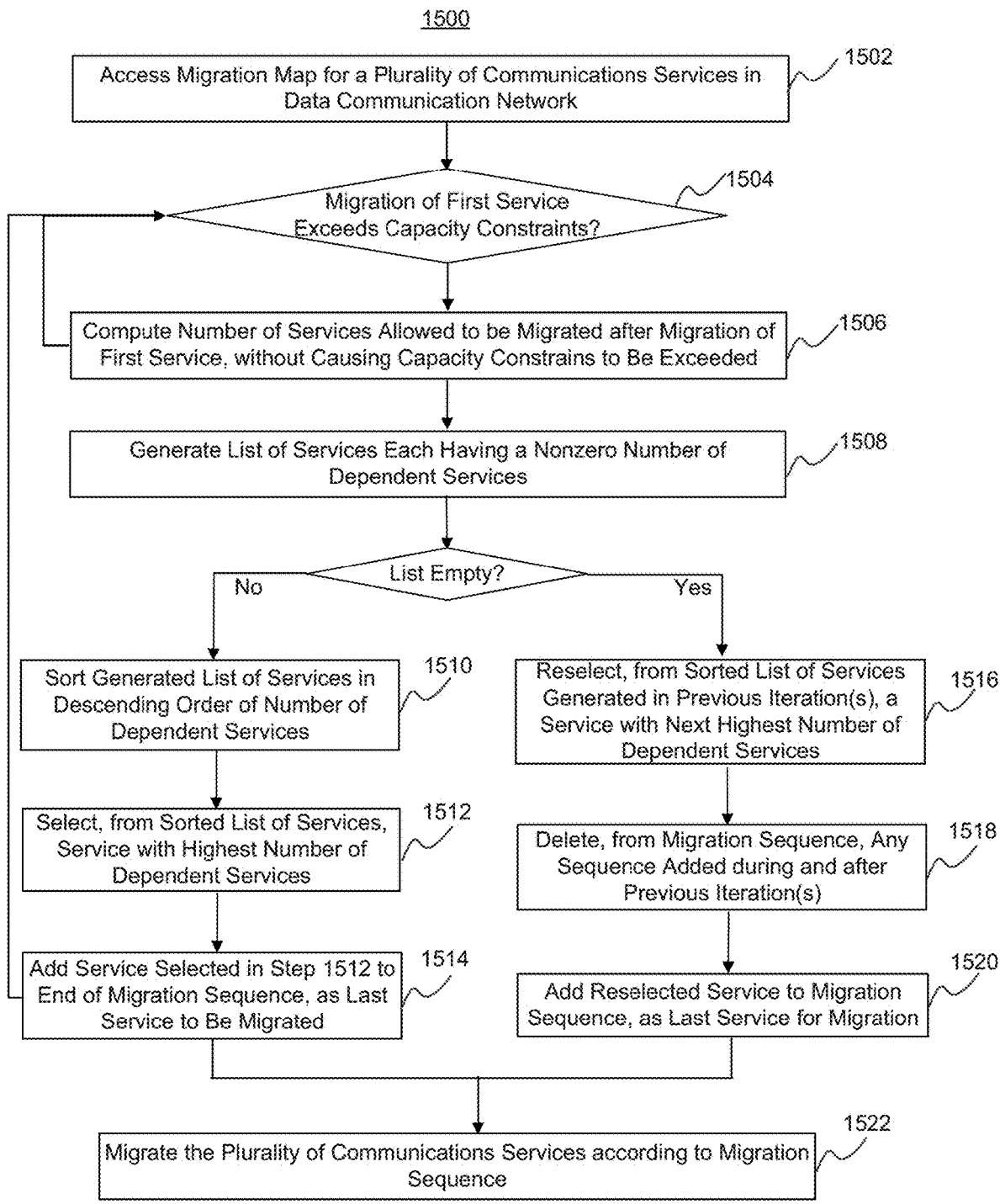
FIG. 15 is a flowchart of an example process for migrating communications services in a data communication network in which one or more migration paths have limited capacities, consistent with the disclosed embodiments.

FIG. 15 is a flowchart of an example process 1500 for migrating communications services in a data communication network in which one or more migration paths have limited capacities, in accordance with embodiments of the present disclosure. The steps associated with this example process 1500 may be performed by, for example, a processor of the network management system 150 of FIG. 1. The example process 1500 allows a service provider to determine a legal migration sequence that migrates the most services, without exceeding the capacity limits of the paths in the data communication network.

In step 1502, the network management system accesses a migration map for a plurality of communications services in the data communication network. For example, the migration map may show routes of services before and after the migration. The migration map may also identify resources allocated on paths for services, such as a wavelength, bandwidth, and/or time slot configured for the service on an associated service path. The migration map may also identify the capacity limits of the paths and the current loads on the paths. The capacity limit of a path indicates the maximum amount of resources that can be provided by the path. The current load of a path indicates the amount of resources required by the service(s) currently occupying the path. The present disclosure does not limit the methods used for quantifying the resources. The migration map may be stored in a database connected to the network management system, such as the database 170, or stored locally in the network management system.

In some embodiments, a service may be configured to migrate on multiple bonded routes and require the same or different amounts of resources on the multiple bonded routes. For example, a routing strategy of ECMP (Equal Cost Multi Path) or LAG (link aggregation) may be used to migrate the service along the multiple bonded routes. The ECMP strategy can be used to maintain an equal share of migration traffic (i.e., an equal amount of required resources) on each of the multiple bonded routes. The LAG strategy can be used to combine the multiple bonded routes and perform load balancing among them to improve migration performance. Consistent with the disclosed embodiments, to migrate a service using multiple routes, the service may be split into a set of sub-services, each of which having its own route and requiring a certain amount of resources. These sub-services can also be migrated using the process 1500, with each sub-service being treated as an independent service.

In step 1504, the network management system determines whether migrating a first service in the plurality of communications services causes a capacity constraint on routes in the migration map to be exceeded. For example, the first service may be a service for which no migration sequence has been determined. The migration map thus identifies that the first service is configured to migrate from a first route to a second route, and a set of other services are configured to migrate from a first set of routes to a second set of routes. The migration map also identifies that the second route at least partially overlaps with the first set of routes or the second set of routes, and therefore, after the first service is migrated, a certain path could be occupied by both the first service and the set of other services.

The network management system determines whether the capacity limit of any path would be exceeded by the migration of the first service. In particular, as illustrated in the above examples in connection with FIG. 14, the network management system determines whether the migration of the first service will cause the load on any path to exceed the capacity limit of that path. This includes: checking whether the second route at least partially overlaps with any one of the first set of routes (i.e., whether there is a dependency between the second route and the first set of routes); and if the second route at least partially overlaps with at least one of the first set of routes, determining whether the loads on the overlapping path would exceed the maximum capacity of the overlapping path after the first service is migrated. If it is determined that migrating the first service does not cause the capacity limits on the routes to be exceeded, the network management system proceeds to step 1506. If it is determined that migrating the first service causes the capacity limits on the routes to be exceeded, step 1506 is skipped.

In step 1506, the network management system computes the number of services that are allowed to be migrated after the migration of the first service, without causing the capacity constrains on the routes to be exceeded. In particular, the network management system checks whether the second route at least partially overlaps with any one of the second set of routes (i.e., whether there is a dependency between the second route and the second set of routes). If the second route does not overlap with the second set of routes, all the set of other services are allowed to be migrated. If the second route at least partially overlaps with at least one of the second set of routes, the network management system determines whether migrating any of the set of other services would cause the capacity limit(s) of the overlapping path(s) to be exceeded. In the present disclosure, if in step 1506 it is determined that a service is allowed to be migrated after the migration of the first service, the service is called a "dependent service" of the first service.

In step 1508, the network management system repeats steps 1504 and 1506 for all the services for which no migration sequence has been determined, and generates a list of services each having a nonzero number of dependent services. If the generated list of services is not empty, the network management system proceeds to step 1510.

In step 1510, the network management system sorts the generated list of services in a descending order of the number of dependent services.

In step 1512, the network management system selects, from the sorted list of services, a service with a highest number of dependent services.

In step 1514, the network management system adds the service selected in step 1512 to the end of the migration sequence, as the last service to be migrated.

Consistent with the disclosed embodiments, the network management system can perform steps 1504-1514 iteratively until the full migration sequence for the plurality of communications services is determined.

In some embodiments, if the generated list of services in 1508 is empty, the network management system may select the next best solution by performing the following operations: reselecting, from a sorted list of services that is generated in the immediately last iteration, a service with a next highest number of dependent services (step 1516); deleting, from the migration sequence, any sequence added during and after the immediately last iteration (step 1518); and adding the reselected service to the migration sequence, as the last service for migration (step 1520). If the immediately last iteration does not have the next highest number of dependent services, the network management system may go back two or more iterations until there is a next highest number of dependent services, and perform operations similar to steps 1516-1520. In one embodiment, a maximum number is set for the number of iterations that the network management system can go back.

It is contemplated that the methods for finding the service with most dependent services are not limited to the above embodiments described in connection with steps 1510-1520. Variations of these embodiments that are evident to one of ordinary skill in the art, and/or other methods known in the art, can also be used for finding the best solution.

If the network management system cannot find the next best solution by going back the maximum number of previous iterations, the network management system stops the process of determining the migration sequence and outputs the existing migration sequence as the final result. In one embodiment, if the network management system cannot find the next best solution by going back to previous iterations and thus one or more services are not covered by the migration sequence, the network management system may migrate the uncovered services via temporary configurations (e.g., temporary paths or temporary wavelengths).

In step 1522, the network management system migrates the plurality of communications services according to the migration sequence. By migrating the services according to the migration sequence, the capacities of the migration routes and the dependency relation among the migrations of service are considered, thereby ensuring the services be migrated without exceeding the system limit of the data communication network or disrupting the services.

As an example for implementing the process 1500, referring to the above description in connection with FIG. 14, service $S_1$ or service $S_4$ can be migrated at the first step of a legal migration sequence. The network management system may determine that $S_2$ is the dependent service of $S_1$, and $S_5$ is the dependent service of $S_4$ (iteration 1—step 1508). If the network management system chooses $S_4$ as the first service to be migrated (iteration 1—step 1514), in the next iteration the network management system determines that no other services can be migrated after $S_5$, and therefore the list of services generated in step 1508 is empty (iteration 2—step 1508). The network management system thus goes back to the last iteration and chooses $S_1$ as the first service to be migrated (iteration 1—step 1514). Then in iteration 2, the network management system determines that $S_3$ is the dependent service of $S_2$ (iteration 1—step 1508) and chooses $S_2$ as the second service to be migrated in the migration sequence (iteration 2—step 1514). By continuing the iterations, the network management system finally determines that the maximum legal migration sequence is ($S_1$, $S_2$, $S_3$, $S_4$, $S_5$).

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A method for migrating a plurality of communications services in a data communication network, comprising:
   accessing a migration map for the plurality of communications services in the data communication network;
   identifying a communications dependency between a first service and a second service in the plurality of communications services according to the migration map, wherein the first service is configured to migrate from a first route to a second route, the second service is configured to migrate from a third route to a fourth route, and the third route at least partially overlaps with the second route;
   determining a migration sequence based on the identified communications dependency, wherein the migration sequence includes a largest subset of the plurality of communications services of which no more than M communications services are allowed to migrate from pre-migration configurations to temporary routes, before migrating to post-migration configurations; and
   migrating the plurality of communications services from a first plurality of configurations to a second plurality of configurations according to the migration sequence.

2. The method of claim 1, wherein M equals zero.

3. The method of claim 1, further comprising:
   constructing a communications dependency graph identifying communications dependencies among the plurality of communications services in the data communication network, wherein the communications dependency graph includes a plurality of vertices, each of the plurality of vertices corresponding to a pre-migration configuration and a post-migration configuration of a service in the data communication network, and wherein a first vertex is connected with a second vertex with an edge directed from the second vertex to the first vertex, the first vertex corresponding to a pre-migration configuration and a post-migration configuration of the first service, the second vertex corresponding to a pre-migration configuration and a post-migration configuration of the second service.

4. The method of claim 3, further comprising:
   generating a strongly connected component (SCC) graph of the dependency graph, the SCC graph comprising:
   a plurality of SCCs in the dependency graph, wherein each of the plurality of SCCs includes a set of vertices in the dependency graph, wherein a third vertex and a fourth vertex in a same SCC have a first direct path from the third vertex to the fourth vertex and a second direct path from the fourth vertex to the third vertex, and wherein a fifth vertex in a first SCC and a sixth vertex in a second SCC have no directed path from the fifth vertex to the sixth vertex or from the sixth vertex to the fifth vertex; and
   a plurality of edges connecting the plurality of SCCs, wherein an edge in the SCC graph connecting the first SCC to the second SCC representing existence of one or more edges in the dependency graph from vertices in the first SCC to vertices of the second SCC.

5. The method of claim 4, further comprising:
   identifying one or more special vertices in each of the plurality of SCCs.

6. The method of claim 4, wherein the SCC graph includes a third SCC having one or more circles, and the method further comprises:
   identifying a special vertex in each of the one or more cycles in the third SCC; and
   breaking each of the one or more cycles based on the special vertex.

7. The method of claim 5, further comprising:
   identifying, among the plurality of SCCs, a third SCC with no outgoing edges;

deleting, from the communications dependency graph, all vertices in the third SCC;

determining a sum of special vertices in remaining SCCs;

repeating the identifying step, the deleting step, and the determining step until the determined sum is equal to or less than M;

breaking each cycle remaining in the communications dependency graph, based on special vertices in the remaining SCCs; and migrating communications services corresponding to vertices remaining in the communications dependency graph.

8. The method of claim 7, further comprising:
determining the migration sequence based on a topological sort of the vertices remaining in the communications dependency graph.

9. The method of claim 1, wherein the data communication network comprises:
a first set of wavelengths configured for the second route and a second set of optical wavelengths configured for the third route, the first set of wavelengths and second set of optical wavelengths having at least one common optical wavelength, and the second route sharing at least one path with the third route.

10. A network management system for migrating a plurality of communications services in a data communication network, the system comprising:
at least one processor; and
a memory for storing instructions executable by the at least one processor;
wherein the at least one processor is configured to:
access a migration map for the plurality of communications services in the data communication network;
identify a communications dependency between a first service and a second service in the plurality of communications services according to the migration map, wherein the first service is configured to migrate from a first route to a second route, the second service is configured to migrate from a third route to a fourth route, and the third route at least partially overlaps with the second route;
determine a migration sequence based on the identified communications dependency, wherein the migration sequence includes a largest subset of the plurality of communications services of which no more than M communications services are allowed to migrate from pre-migration configurations to temporary routes, before migrating to post-migration configurations; and
migrate the plurality of communications services from a first plurality of configurations to a second plurality of configurations according to the migration sequence.

11. The network management system of claim 10, wherein M equals zero.

12. The network management system of claim 10, wherein the at least one processor is further configured to:
construct a communications dependency graph identifying communications dependencies among the plurality of communications services in the data communication network, wherein the communications dependency graph includes a plurality of vertices, each of the plurality of vertices corresponding to a pre-migration configuration and a post-migration configuration of a service in the data communication network, and wherein a first vertex is connected with a second vertex with an edge directed from the second vertex to the first vertex, the first vertex corresponding to a pre-migration configuration and a post-migration configuration of the first service, the second vertex corresponding to a pre-migration configuration and a post-migration configuration of the second service.

13. The network management system of claim 12, wherein the at least one processor is further configured to:
generate a strongly connected component (SCC) graph of the dependency graph, the SCC graph comprising:
a plurality of SCCs in the dependency graph, wherein each of the plurality of SCCs includes a set of vertices in the dependency graph, wherein a third vertex and a fourth vertex in a same SCC have a first direct path from the third vertex to the fourth vertex and a second direct path from the fourth vertex to the third vertex, and wherein a fifth vertex in a first SCC and a sixth vertex in a second SCC have no directed path from the fifth vertex to the sixth vertex or from the sixth vertex to the fifth vertex; and
a plurality of edges connecting the plurality of SCCs, wherein an edge in the SCC graph connecting the first SCC to the second SCC representing existence of one or more edges in the dependency graph from vertices in the first SCC to vertices of the second SCC.

14. The network management system of claim 13, wherein the at least one processor is further configured to:
identify one or more special vertices in each of the plurality of SCCs.

15. The network management system of claim 13, wherein the SCC graph includes a third SCC having one or more circles, and wherein the at least one processor is further configured to:
identify a special vertex in each of the one or more cycles in the third SCC; and
break each of the one or more cycles based on the special vertex.

16. The network management system of claim 14, wherein the at least one processor is further configured to:
identify, among the plurality of SCCs, a third SCC with no outgoing edges;
delete, from the communications dependency graph, all vertices in the third SCC;
determine a sum of special vertices in remaining SCCs;
repeat the identifying step, the deleting step, and the determining step until the determined sum is equal to or less than M;
break each cycle remaining in the communications dependency graph, based on special vertices in the remaining SCCs; and
migrate communications services corresponding to vertices remaining in the communications dependency graph.

17. The network management system of claim 16, wherein the at least one processor is further configured to:
determine the migration sequence based on a topological sort of the vertices remaining in the communications dependency graph.

18. A non-transitory computer readable medium storing a set of instructions that is executable by at least one processor of a network management system to cause the network management system to perform operations for migrating a plurality of communications services in a data communication network, the operations comprising:
accessing a migration map for the plurality of communications services in the data communication network;
identifying a communications dependency between a first service and a second service in the plurality of communications services according to the migration map, wherein the first service is configured to migrate from a first route to a second route, the second service is configured to migrate from a third route to a fourth route, and the third route at least partially overlaps with the second route;

determining a migration sequence based on the identified communications dependency, wherein the migration sequence includes a largest subset of the plurality of communications services of which no more than M communications services are allowed to migrate from pre-migration configurations to temporary routes, before migrating to post-migration configurations; and migrating the plurality of communications services from a first plurality of configurations to a second plurality of configurations according to the migration sequence.

19. The non-transitory computer readable medium of claim 18, wherein M equals zero.

20. The non-transitory computer readable medium of claim 18, wherein the operations further comprise:

constructing a communications dependency graph identifying communications dependencies among the plurality of communications services in the data communication network, wherein the communications dependency graph includes a plurality of vertices, each of the plurality of vertices corresponding to a pre-migration configuration and a post-migration configuration of a service in the data communication network, and wherein a first vertex is connected with a second vertex with an edge directed from the second vertex to the first vertex, the first vertex corresponding to a pre-migration configuration and a post-migration configuration of the first service, the second vertex corresponding to a pre-migration configuration and a post-migration configuration of the second service.

21. The non-transitory computer readable medium of claim 20, wherein the operations further comprise:

generating a strongly connected component (SCC) graph of the dependency graph, the SCC graph comprising:

a plurality of SCCs in the dependency graph, wherein each of the plurality of SCCs includes a set of vertices in the dependency graph, wherein a third vertex and a fourth vertex in a same SCC have a first direct path from the third vertex to the fourth vertex and a second direct path from the fourth vertex to the third vertex, and wherein a fifth vertex in a first SCC and a sixth vertex in a second SCC have no directed path from the fifth vertex to the sixth vertex or from the sixth vertex to the fifth vertex; and a plurality of edges connecting the plurality of SCCs, wherein an edge in the SCC graph connecting the first SCC to the second SCC representing existence of one or more edges in the dependency graph from vertices in the first SCC to vertices of the second SCC.

22. The non-transitory computer readable medium of claim 21, wherein the operations further comprise:

identifying one or more special vertices in each of the plurality of SCCs.

23. The non-transitory computer readable medium of claim 21, wherein the SCC graph includes a third SCC having one or more circles, and the operations further comprise:

identifying a special vertex in each of the one or more cycles in the third SCC; and breaking each of the one or more cycles based on the special vertex.

24. The non-transitory computer readable medium of claim 22, wherein the operations further comprise:

identifying, among the plurality of SCCs, a third SCC with no outgoing edges;

deleting, from the communications dependency graph, all vertices in the third SCC;

determining a sum of special vertices in remaining SCCs;

repeating the identifying step, the deleting step, and the determining step until the determined sum is equal to or less than M;

breaking each cycle remaining in the communications dependency graph, based on special vertices in the remaining SCCs; and migrating communications services corresponding to vertices remaining in the communications dependency graph.

25. The non-transitory computer readable medium of claim 22, wherein the operations further comprise:

determining the migration sequence based on a topological sort of the vertices remaining in the communications dependency graph.

* * * * *